US012648664B2

(12) United States Patent
Park et al.

(10) Patent No.: US 12,648,664 B2
(45) Date of Patent: Jun. 9, 2026

(54) ELECTRIC KETTLE

(71) Applicant: LG ELECTRONICS INC., Seoul (KR)

(72) Inventors: Jong-won Park, Seoul (KR); Dae-yong Kang, Seoul (KR); Jae-hoon Ahn, Seoul (KR); June-young Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 952 days.

(21) Appl. No.: 17/793,604

(22) PCT Filed: Dec. 22, 2020

(86) PCT No.: PCT/KR2020/018924
§ 371 (c)(1),
(2) Date: Jul. 18, 2022

(87) PCT Pub. No.: WO2021/149927
PCT Pub. Date: Jul. 29, 2021

(65) Prior Publication Data
US 2023/0060143 A1      Mar. 2, 2023

(30) Foreign Application Priority Data

Jan. 22, 2020    (KR) ........................ 10-2020-0008931
Mar. 19, 2020    (KR) ........................ 10-2020-0033891

(51) Int. Cl.
*A47J 27/21*           (2006.01)
(52) U.S. Cl.
CPC ...  *A47J 27/21191* (2013.01); *A47J 27/21008* (2013.01); *A47J 27/21175* (2013.01)

(58) Field of Classification Search
CPC ............ A47J 27/21175; A47J 27/21008; A47J 27/21191
(Continued)

(56) References Cited

U.S. PATENT DOCUMENTS 1,415,456 A * 5/1922 Lauth ....................... H05B 6/00
                                                     219/50
1,530,416 A * 3/1925 Saeki .................... A47J 37/015
                                                     219/415
(Continued)

FOREIGN PATENT DOCUMENTS

CN          205338635 U      6/2016
CN          106308494 A * 1/2017    ........ A47J 27/21008
(Continued)

*Primary Examiner* — Jimmy Chou
(74) *Attorney, Agent, or Firm* — Bryan Cave Leighton Paisner LLP

(57)              ABSTRACT

Proposed is an electric kettle having a water outlet. The electric kettle includes: a body in which water or food is accommodated; a lid for covering the opened upper side of the body; a base which is provided on the underside of the body and supports the body; a water outlet assembly which is provided at one side of the body and guides the contents in the body to be discharged; a handle provided at one side of the body and configured to be gripped by hand; and a heating module which is provided at one side of the body and heats the space inside the body to increase and control the temperature of the contents, wherein the water outlet assembly has a structure which is composed of one or more elements and blocks a gap between the water outlet assembly and the body to prevent leakage of water.

10 Claims, 29 Drawing Sheets

(58) Field of Classification Search
USPC ........................................................ 219/441
See application file for complete search history.

(56) References Cited

U.S. PATENT DOCUMENTS

| | | | | |
|---|---|---|---|---|
| 6,172,341 | B1 * | 1/2001 | Hoffmann | A47J 27/21175 219/441 |
| 9,226,610 | B2 * | 1/2016 | Bodum | A47J 41/0083 |
| 11,672,372 | B2 * | 6/2023 | Park | A47J 27/2105 219/432 |
| 2007/0221650 | A1 * | 9/2007 | De Oliveira | A47J 36/36 219/386 |
| 2009/0139324 | A1 | 6/2009 | Morimoto et al. | |
| 2010/0270284 | A1 * | 10/2010 | Cohen | A47J 27/21175 219/507 |
| 2011/0259871 | A1 * | 10/2011 | Li | H05B 1/0269 219/441 |
| 2011/0265562 | A1 * | 11/2011 | Li | A47J 27/212 73/304 C |
| 2012/0145698 | A1 * | 6/2012 | Von Seidel | A47J 27/21016 219/438 |
| 2014/0246428 | A1 * | 9/2014 | Bodum | A47J 41/0055 220/62.11 |
| 2020/0037806 | A1 * | 2/2020 | Farhamandfar | A47J 27/21191 |
| 2022/0104649 | A1 * | 4/2022 | Ahn | A47J 27/21066 |
| 2022/0240709 | A1 * | 8/2022 | Lee | A47J 27/21175 |

FOREIGN PATENT DOCUMENTS

| | | | | |
|---|---|---|---|---|
| CN | 205923741 A | 2/2017 | | |
| CN | 207604800 U | 7/2018 | | |
| CN | 208837626 U | * | 5/2019 | A47J 27/21 |
| GB | 2091990 A | * | 8/1982 | A47J 27/21191 |
| KR | 10-2011-0100458 A | 9/2011 | | |
| KR | 10-1631556 A | 6/2016 | | |
| KR | 10-1794021 B1 | 11/2017 | | |

* cited by examiner

ELECTRIC KETTLE

This application is a National Stage Application of International Application No. PCT/KR2020/018924 filed on Dec. 22, 2020 which claims priority to KR 10-2020-0008931, filed Jan. 22, 2020 and KR 10-2020-0033891, filed Mar. 19, 2020, all of which are incorporated by reference, as if fully set forth herein.

TECHNICAL FIELD

The present disclosure relates to an electric kettle and, more particularly, to an electric kettle having a water outlet.

BACKGROUND ART

In general, an electric kettle refers to a device for heating contents including water contained in a main body with a heating means such as a heater by supplying electricity.

Most electric kettles are configured such that the main body can be detached from a base to which power is supplied, be heated while seated on the base, and be used by holding a handle and lifting the main body to separate the main body from the base. Electric kettles of this type are commonly called by various names such as cordless electric kettles, cordless electric pots, and coffee pots.

Such an electric kettle has a complex body shape, and in order to facilitate the arrangement of internal components, the body is sometimes made of a plastic material.

However, when used for a long period of time, harmful substances of plastics or microplastics may be dissolved in high temperature water, and internal contamination may occur since a plastic body is vulnerable to scratches.

When the body is made of a glass material, it is excellent for hygiene and offers stylish looks, but there is a risk of damage caused by impact, etc. In addition, it is inconvenient to use due to heavy weight, and difficult to mold.

Accordingly, as in Korean Patent No. 10-1631556, a technology in which a container is made of a ceramic material is disclosed.

Yet, in this case of the related art, since a spout from which water inside the container is discharged is integrally formed with the container (body), manufacturing is difficult. Moreover, there is no configuration in the spout to filter out foreign substances or debris, so if there are foreign substances or debris inside the container, these foreign substances or debris are discharged together with water (liquid) through the spout.

Meanwhile, Korean Patent No. 10-1794021 ("ELECTRIC KETTLE COMBINED WITH BLENDER AND STEAMER") discloses a technology in which a filter is provided inside a spout.

However, even in this conventional case, since the filter is detachably installed inside a spout, manufacturing efficiency is lowered, and since the spout is integrally formed at the top of a container, there is still a problem that it is difficult to manufacture.

In U.S. Pat. No. 9,226,610 B2, a case in which a spout is further equipped with a screen insert to filter out foreign substances is disclosed. However, since the screen insert is formed in a separate component provided on the upper part of a body, the structure is complicated, which leads to excessive manufacturing cost, and there is a problem that molding is difficult because the spout is integrally formed at the top of the body and protrudes outward.

DISCLOSURE

Technical Problem

The present disclosure has been made keeping in mind the problems occurring in the related art. An objective of the present disclosure is to provide an electric kettle in which a water outlet assembly is separately provided on one side of a body to be assembled.

An objective of the present disclosure is to provide an electric kettle in which a filter function that filters out food and foreign substances inside the body is formed integrally with the body.

An objective of the present disclosure is to provide an electric kettle consisting of a two-piece water outlet assembly including a water outlet and a packing for preventing water leakage.

An objective of the present disclosure is to provide an electric kettle in which a water outlet assembly is fixed to a body by welding.

An objective of the present disclosure is to provide an electric kettle in which a water outlet assembly is press-fitted to a body.

An objective of the present disclosure is to provide an electric kettle that prevents water discharged from a water outlet assembly from leaking through a gap between inner and outer bodies.

Technical Solution

In order to achieve the above mentioned objective, according to an embodiment of the present disclosure, there is provided an electric kettle in which a water outlet assembly may be provided separately and assembled in a double body.

In the electric kettle according to the present disclosure, a filter function for filtering out foreign substances (debris) in the liquid discharged through the water outlet assembly may be integrally formed in the body.

In the electric kettle according to the present disclosure, the water outlet assembly, which guides the water inside the body to the outside and blocks water leakage at the same time, may consist of two pieces.

In the electric kettle according to the present disclosure, the water outlet assembly may be fixed to the body by welding.

In the electric kettle according to the present disclosure, the water outlet assembly may be press-fitted to the body.

In the electric kettle according to the present disclosure, a sealant may be applied around the water outlet assembly.

In the electric kettle according to the present disclosure, the water outlet assembly may be fixed to the body by a bracket.

In the electric kettle according to the present disclosure, the water outlet assembly may be fixed to the body by a fastening means.

In the electric kettle according to the present disclosure, a mesh may be provided on one side of the body to filter out foreign substances (debris) in the liquid discharged through the water outlet assembly.

An electric kettle according to the present disclosure includes: a body in which water or food is accommodated; a lid for covering an opened upper side of the body; a base which is provided on an underside of the body and supports the body; a water outlet assembly which is provided at a side of the body and guides contents in the body to be discharged; a handle provided at a side of the body and configured to be gripped by hand; and a heating module which is provided at a side of the body and heats a space inside the body to increase and control a temperature of the contents, wherein the water outlet assembly may have a structure which is composed of one or more elements and may block a gap between the water outlet assembly and the body to prevent leakage of water.

The water outlet assembly may be configured to include a water outlet which is installed to protrude sideward from the body and guides liquid inside the body to be discharged outside, and a packing body provided on a side of the water outlet to shield a gap between the water outlet and the body, and in the body, a filter function for filtering out foreign substances discharged through the water outlet assembly may be integrally formed.

The water outlet may be configured to include a water outlet body that serves as a path for discharging water, and a water outlet coupling end formed integrally on a side of the water outlet body and coupled to the body.

The packing body may be configured to include a packing frame coupled to an end of the water outlet coupling, and a water outlet packing made of an elastic material coupled to the packing frame.

The packing frame and the water outlet packing may be integrally formed by injection molding.

The water outlet coupling end may have a circular arc shape, and may have a packing fixed end at each end thereof to which an end of the packing body is fixedly mounted.

The water outlet packing may be configured to include a packing fastening portion coupled to the packing frame and mounted on the packing fixed end, and a packing portion formed integrally with the packing fastening portion and sealing a gap between the body and the water outlet coupling end by elasticity.

The packing frame may be installed to cross opposite ends of the water outlet coupling end.

At an end of the water outlet coupling end, a packing seating groove in which the packing portion is seated may be formed to be depressed to one side.

On a surface of the water outlet coupling end, a plurality of welding protrusions may be formed to protrude outward.

The water outlet assembly may be coupled to the body by welding.

The water outlet assembly may be joined to the body by series welding.

The water outlet assembly may be configured to include a water outlet which is installed to protrude sideward from the body and guides liquid inside the body to be discharged outside, and a packing member provided on one side of the water outlet and shielding a gap between the water outlet and the body, and the water outlet assembly may be fixed by press-fitting to the body.

The water outlet assembly may be configured to include a water outlet which is installed to protrude sideward from the body and guides liquid inside the body to be discharged outside, wherein a sealant may be applied between the water outlet and the body.

Advantageous Effects

As described above, an electric kettle of the present disclosure has the following effects.

First, in the present disclosure, a water outlet assembly through which the water inside a body can be poured is separately provided and assembled to the double body. Therefore, compared to the case where a water outlet is integrally formed with the body, it is easier to manufacture the body, thereby improving manufacturing efficiency.

Second, in the present disclosure, a filter function that filters out foreign substances (debris) in the liquid discharged through the water outlet assembly is integrally formed in the body. That is, a plurality of water outlet holes are formed in the inner body to serve as a filter preventing foreign substances inside the body from being discharged to the outside. Therefore, there is no need for a separate filter, and thus manufacturing efficiency is improved and management is convenient.

Third, in the electric kettle of the present disclosure, the water outlet assembly that guides the water inside the body to the outside and blocks water leakage at the same time consists of two pieces. That is, the water outlet assembly mounted on the double body consists of two elements. Therefore, it has the advantage of convenient assembly.

Fourth, in the electric kettle of the present disclosure, the water outlet assembly is fixed to the body by welding. That is, in the present disclosure, the water outlet assembly is attached and fixed to the inner body by direct welding or series welding. Therefore, there is an advantage of facilitating the installation of the water outlet assembly, and since weld marks are not left on the outside of the electric kettle by series welding, there is an effect that the appearance looks sleek and beautiful.

Fifth, in the electric kettle of the present disclosure, the water outlet assembly is coupled to the body by press-fitting. That is, the installation of the water outlet assembly is completed at once by pushing and pressing the water outlet assembly to a bracket fixed to the body. Therefore, there is an advantage that the mounting operation of the water outlet assembly is made easily.

Sixth, in the electric kettle of the present disclosure, a sealant is applied around the water outlet assembly. Therefore, there is an advantage in that leakage through between the double body and the water outlet assembly is blocked.

Seventh, in the electric kettle of the present disclosure, a mesh for filtering out foreign substances (debris) in the liquid discharged through the water outlet assembly is provided on one side of the body. Therefore, it is possible to control the size of foreign substances filtered by exchanging the mesh, and there is an advantage in that even small foreign substances can be filtered out.

Eighth, in the present disclosure, a plurality of water outlet holes are perforated above the body or inner body, and these water outlet holes are arranged so that the number of water outlet holes at the upper side is greater than the number of water outlet holes at the lower side. That is, the number of water outlet holes perforated at the same height increases from the lower part of the body or inner body to the upper part, so that the total number of water outlet holes is arranged in an inverted triangle shape. Accordingly, when pouring water from the electric kettle, the amount of water discharged proportionally increases according to the angle of inclination, so that the convenience of use may be increased. In other words, the more the electric kettle is tilted, the amount of water discharged from the kettle increases.

MODE FOR INVENTION

Hereinafter, an electric kettle according to the present disclosure will be described in detail with reference to the accompanying drawings.

Figure 1:
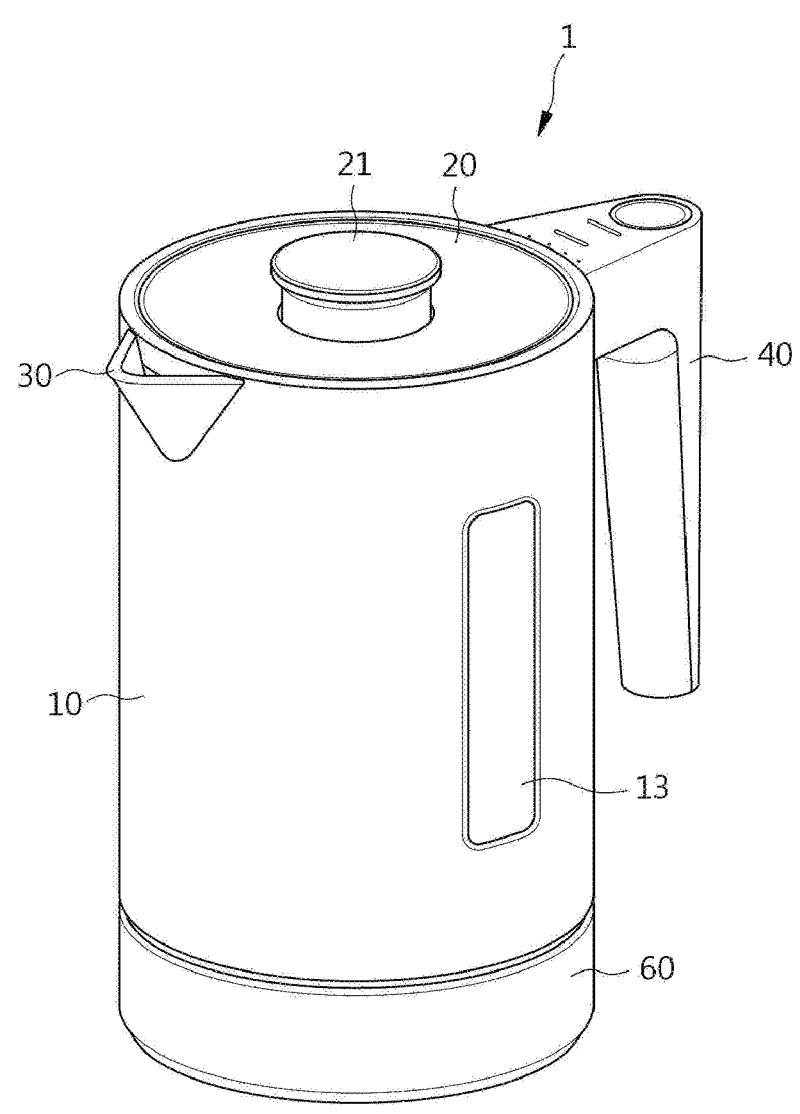
FIG. 1 is a perspective view showing the configuration of a preferred embodiment of an electric kettle according to the present disclosure.
Figure 2:
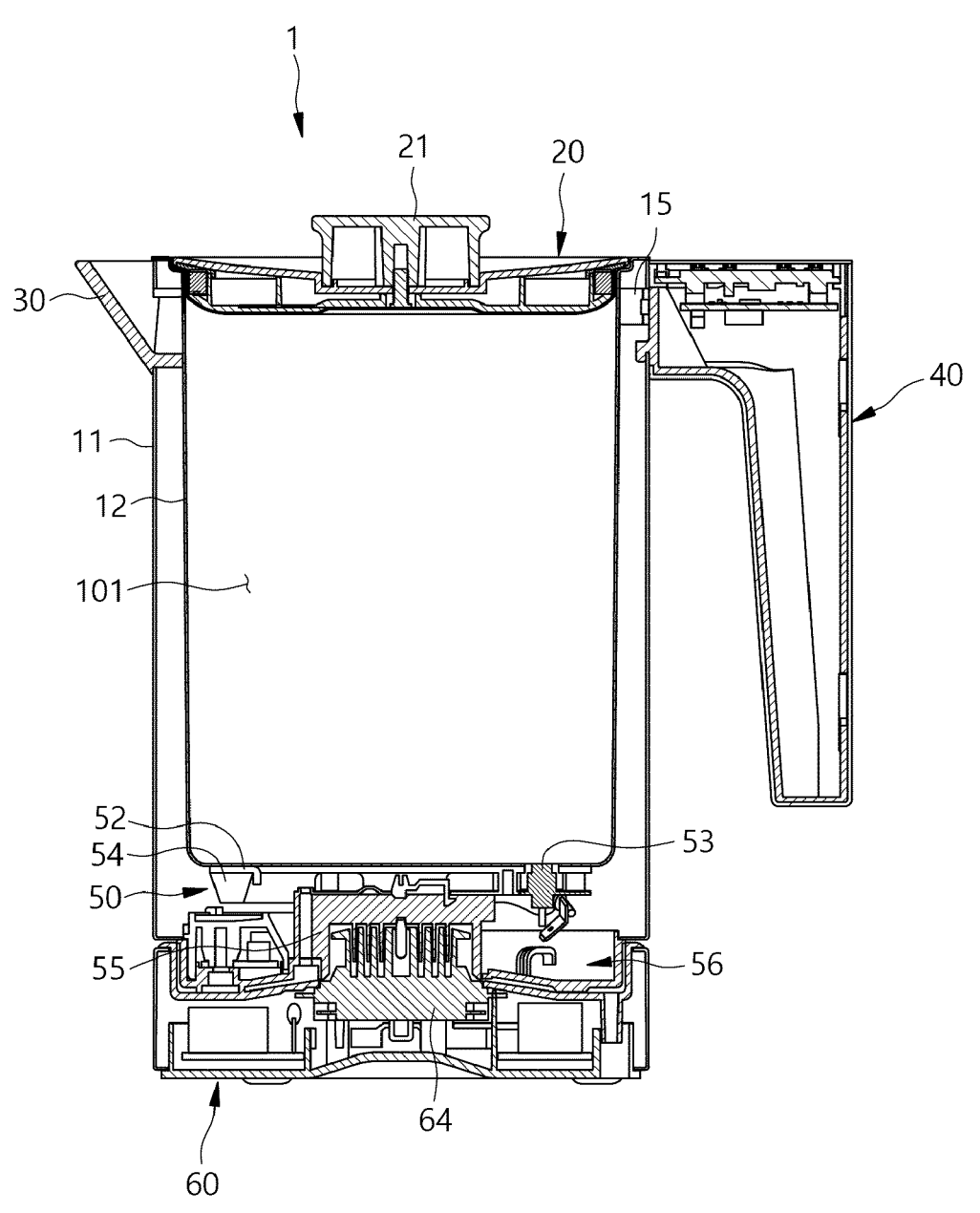
FIG. 2 is a longitudinal sectional view showing the internal configuration of the electric kettle according to the present disclosure.
Figure 3:
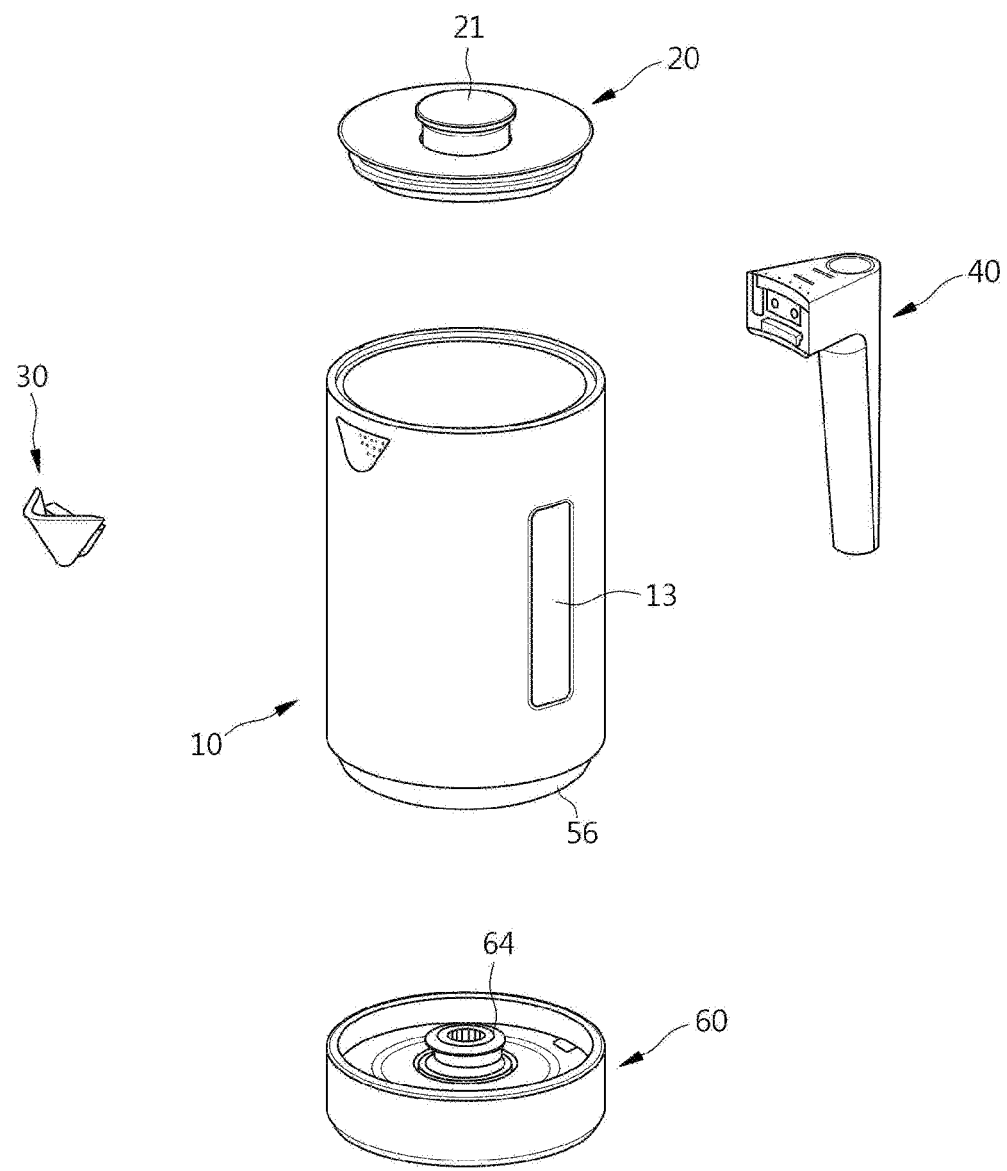
FIG. 3 is an exploded upper perspective view showing the configuration of the electric kettle according to the present disclosure.
Figure 4:
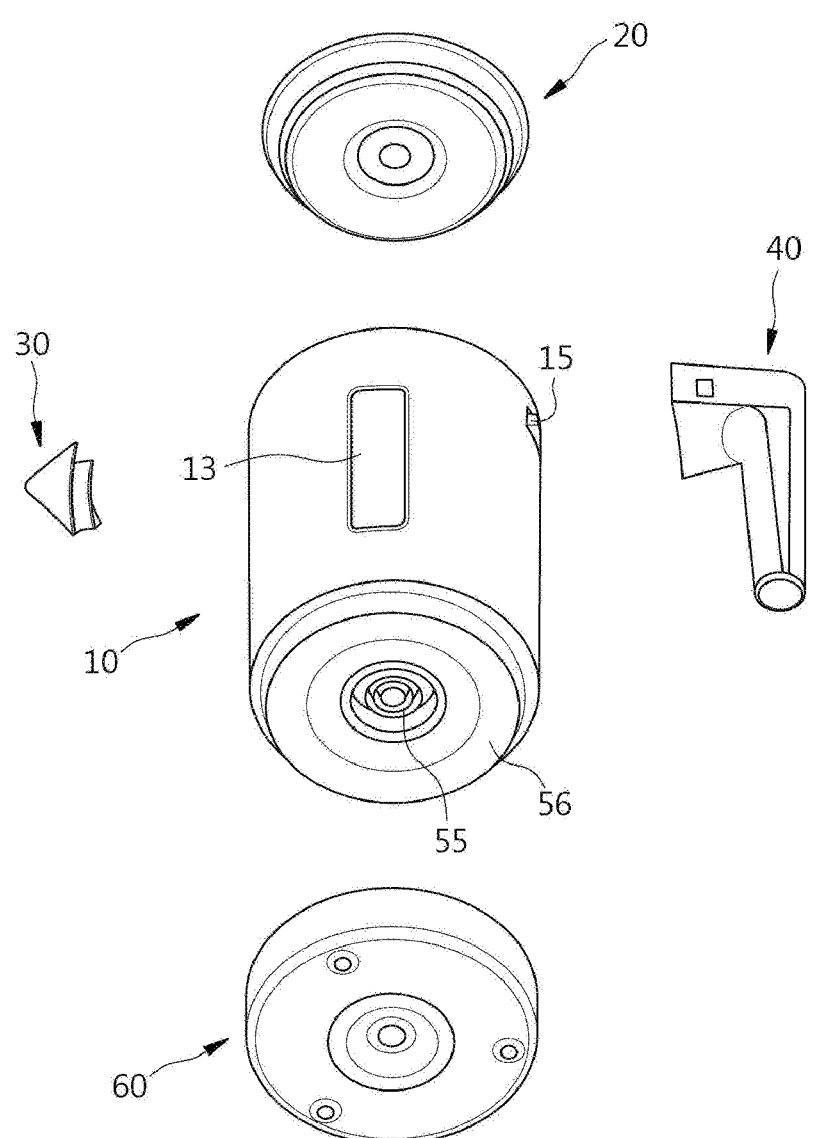
FIG. 4 is an exploded lower perspective view showing the configuration of the electric kettle according to the present disclosure.

FIGS. 1 to 4 show the configuration of an embodiment of an electric kettle according to the present disclosure. That is, FIGS. 1 and 2 are a perspective view and a longitudinal cross-sectional view, respectively, showing the configuration of a preferred embodiment of the electric kettle according to the present disclosure, and FIGS. 3 and 4 are respectively an upper and a lower exploded perspective view of the electric kettle shown in FIG. 1.

As shown in these drawings, the electric kettle 1 according to the embodiment of the present disclosure includes: a body 10 in which water or food is accommodated; a lid 20 for shielding an opened upper side of the body 10; a base 60 which is provided on an underside of the body 10 and supports the body 10; a water outlet assembly 30 which is provided on the upper end of the body 10 and guides contents such as water in the body 10 to be discharged; and a handle 40 fastened to the upper end of the body 10 and configured to be gripped by hand.

To be specific, the electric kettle 1 according to the embodiment of the present disclosure is formed in a cylindrical shape as a whole, and includes the body 10 in which water or food is accommodated, the lid 20 for shielding an opened upper side of the body 10, the handle 40, a heating module 50, and the base 60.

The body 10 may be formed in a cylindrical shape with an open upper surface. Accordingly, the upper surface of the body 10 may be shielded by the lid 20.

The handle 40 may be configured to protrude outward from one side of the body 10. That is, as shown, the handle 40 is provided to protrude to the upper right side of the body 10.

The base 60 is disposed on the bottom surface, and a power cord is connected so that external power may be supplied.

In addition, the assembled body 10 may be seated on the upper surface of the base 60.

The body 10 may be formed in a cylindrical shape to form a heating space 101 in which water may be accommodated and heated. In addition, power may be supplied to the body 10 while being seated on the base 60.

The power supply method between the base 60 and the body 10 may be a power supply method by contacting a power terminal. In addition, the power supply method of the base 60 and the body 10 may be an electromagnetic induction method.

To this end, the base 60 may be provided with a lower power module 64 serving as a primary coil, and the body 10 corresponding thereto may be provided with an upper power module 55 serving as a secondary coil.

A heating module 50 and a bottom assembly 56 are installed at the lower end of the body 10, and since the heating module 50 and the bottom assembly 56 form the lower part of the body 10, they may be collectively referred to as a "lower body".

The heating module 50 includes a heating plate 52 configured to form the bottom surface inside the body 10 or to be in close contact with the bottom surface of the body 10, and a heater 54 for heating the heating plate 52, and the heating plate 52 may be heated by the power supplied from the upper power module 55. In addition, a temperature sensor assembly 53 and the heating module 50 may include a bottom assembly 56 forming the lower surface of the body 10.

In this way, the heating module 50 may have a configuration including: the heating plate 52 configured to form the bottom surface inside the body 10 or to be in close contact with the bottom of the body 10; the heater 54 fixedly mounted on the bottom surface of the heating plate 52; the upper power module 55 for supplying power to a heater assembly 51; the temperature sensor assembly 53; and the bottom assembly 56 forming the lower surface of the body 10.

At one end of the body 10, the water outlet assembly (spout) 30 may be formed to protrude outward so that the water inside the body 10 may be poured.

The handle 40 may be mounted in the opposite direction of the water outlet assembly 30. That is, as shown, it is preferable that the handle 40 is formed on the right side of the body 10, and the water outlet assembly 30 is formed on the left side of the body 10. Accordingly, it is easy for a user to pour water through the water outlet assembly 30 while holding the handle 40 by hand.

Meanwhile, the handle 40 may be fixedly mounted on the outer surface of one side (the right side in the drawing) of the body 10.

The handle 40 is a part gripped by a user's hand so that the user may easily lift or move the electric kettle 1, and the handle 40 may also include a decorative and elastic grip part. That is, the handle 40 has a luxurious exterior, and at least a portion (e.g., a grip portion) may be formed of a rubber or silicone material so as not to slip when the user holds the handle 40.

In addition, it is preferable that the handle 40 is provided with a configuration that may be operated by the user such as a button that allows the user to operate on/off functions or control the temperature. To this end, a printed circuit board (PCB) may be provided inside the handle 40, and the upper surface of the handle 40 may be configured to display the operating state of the electric kettle 1.

The body 10 is preferably constructed with double walls. That is, the body 10 consists of an outer body 11 forming an exterior and an inner body 12 forming an interior.

The handle 40 is configured to be coupled to the upper end of the inner body 12. That is, the inner body 12 is provided with a handle bracket 15, which will be described below, so that the handle 40 is fixed to the handle bracket 15. The handle bracket 15 may be attached and fixed to the outer surface of the inner body 12 by welding or adhesive.

The opened upper surface of the electric kettle 1, that is, the upper surface of the body 10 may be shielded by the lid 20.

The lid 20 forms the upper surface of the electric kettle 1 in a closed state, and comes in contact with the upper periphery of the body 10 to seal the inside of the electric kettle 1.

A cover cap 21 is formed in a central portion of the lid 20 to protrude upward. The cover cap 21 functions to allow a user to easily lift the lid 20 or to be easily coupled to the body 10.

The handle bracket 15 is attached or fixed to the upper end of the inner body 12, and the handle 40 is coupled to the body 10 by a fastening bolt or the like.

In addition, the temperature sensor assembly 53 is provided on the bottom of the inner body 12 to measure the temperature of water inside the heating space 101.

Figure 5:
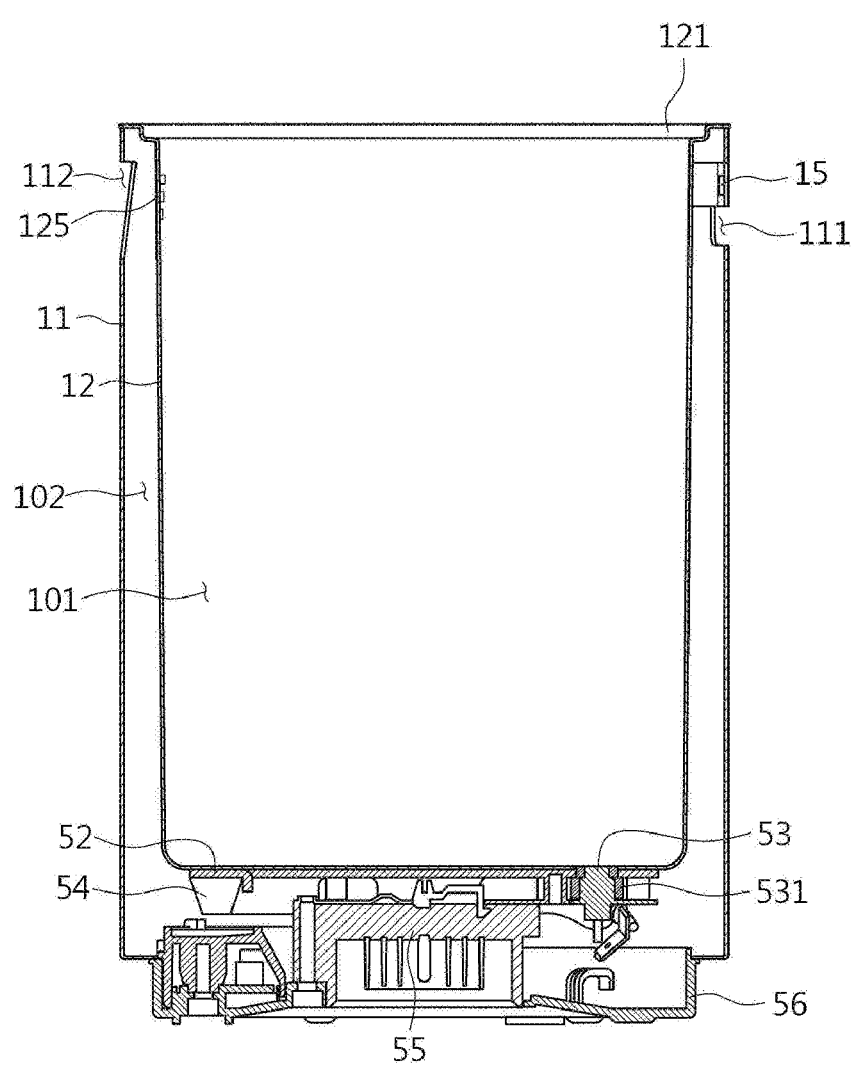
FIG. 5 is a longitudinal cross-sectional view showing the internal configuration of a body constituting the embodiment of the present disclosure.
Figure 6:
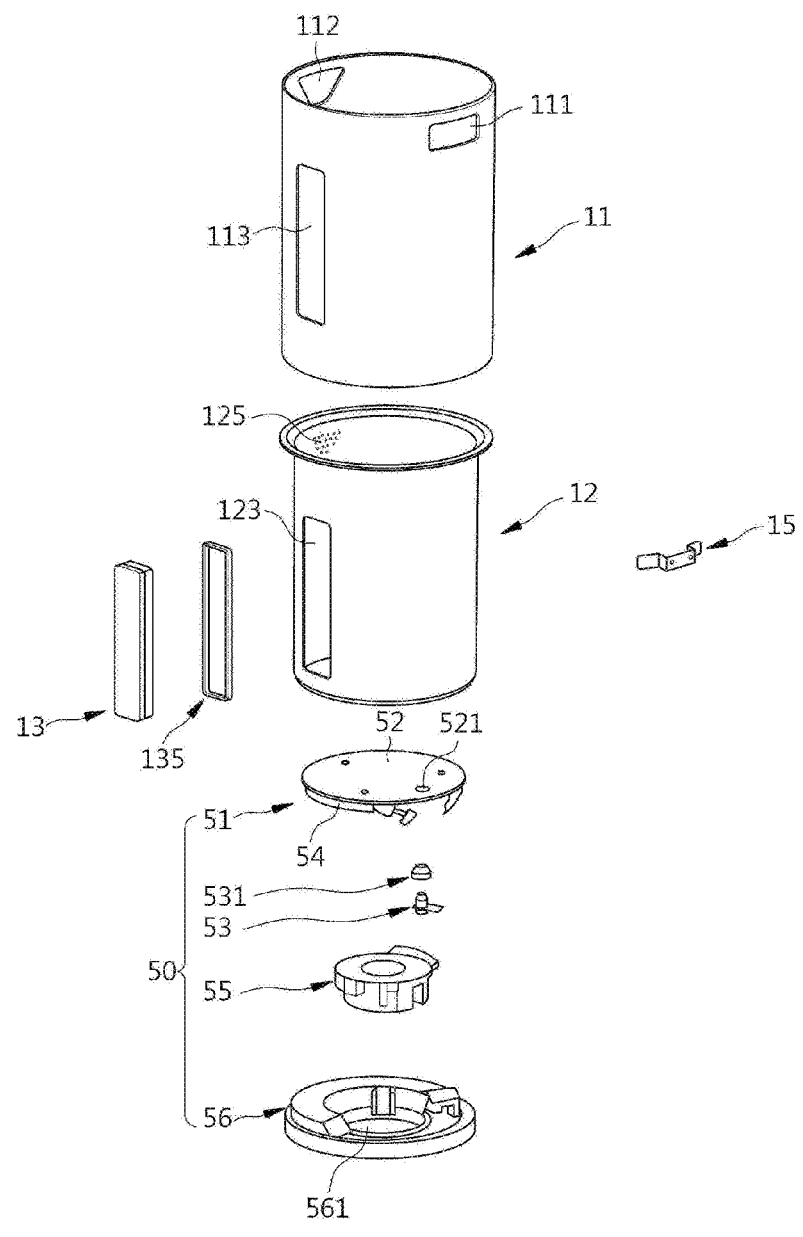
FIG. 6 is an exploded upper perspective view showing the configuration of the body constituting the embodiment of the present disclosure.
Figure 7:
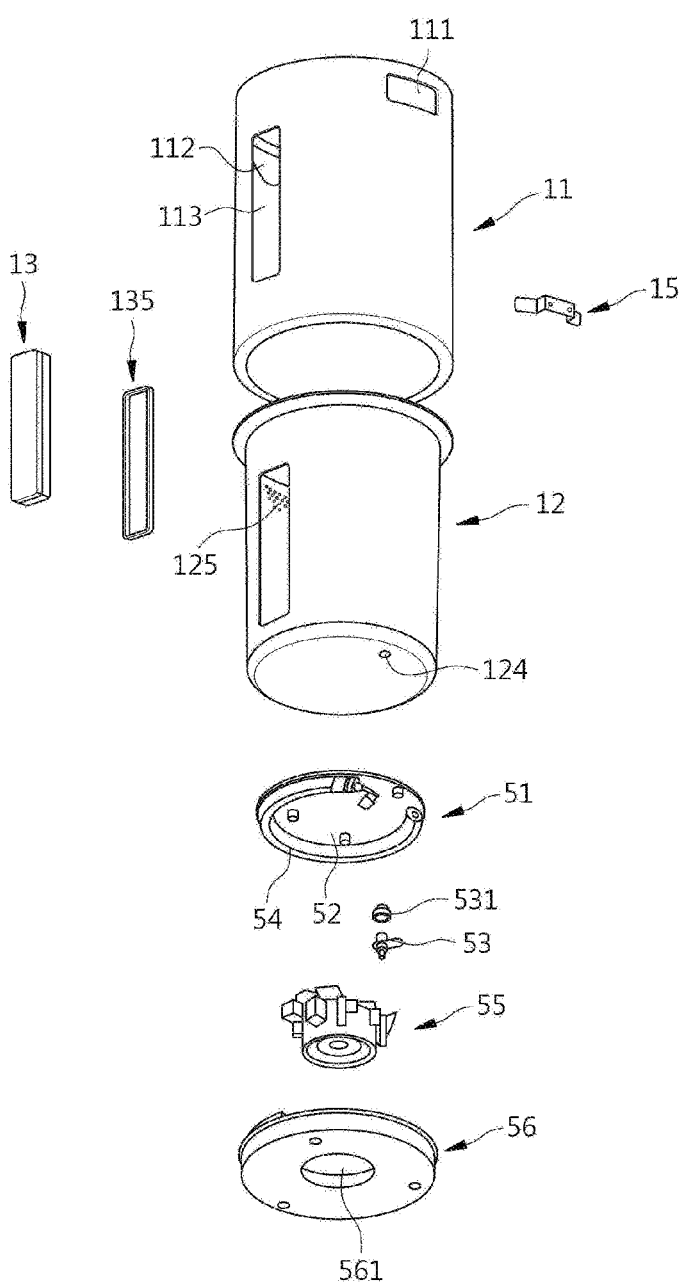
FIG. 7 is an exploded lower perspective view showing the configuration of the body constituting the embodiment of the present disclosure.

FIGS. 5 to 7 show the detailed configuration of the body 10. That is, FIG. 5 is a longitudinal cross-sectional view of the body 10, and FIGS. 6 and 7 are upper and lower exploded perspective views of the body 10, respectively.

As shown in these drawings, the body 10 as a whole is made of a cylindrical shape with an upper opening, and the body 10 is configured so that contents such as water are accommodated in a space formed therein, and a heating module 50 is provided at the lower end to heat the contents inside the body 10.

It is preferable that the body 10 is constructed with double walls. That is, the body 10 includes the inner body 12 forming an interior and the outer body 11 forming an exterior.

As shown, the inner body 12 preferably has a cylindrical shape with an upper side opened, and a space for accommodating water, etc. is formed therein.

The outer body 11 is formed to have a larger diameter than that of the inner body 12 and is installed to surround the outside of the inner body 12. As shown, the outer body 11 preferably has a cylindrical shape with open top and bottom.

Since the inner body 12 is formed to have a smaller diameter than the outer body 11, a gap space 102 is formed between the inner body 12 and the outer body 11 so as to have a structure with significantly improved thermal insulation performance compared to a single-wall structure.

Both the inner body 12 and the outer body 11 may be formed of the same stainless steel material, and the outer body 11 forms the exterior of the body 10, and the inner body 12 forms a space in which water is accommodated.

As such, since the inner body 12 is formed to have a smaller diameter than the outer body 11, the inner body 12 may be provided in a form accommodated inside the outer body 11, and the gap space 102 of a predetermined size may be formed between the outer body 11 and the inner body 12.

An air layer is formed in the gap space 102 between the outer body 11 and the inner body 12 to prevent direct heat transfer to the outer body 11.

Accordingly, the gap space 102 may be referred to as an insulating gap space 102. Even when the water contained in the inner body 12 is heated and hot, the outer body 11 may maintain a relatively low temperature.

In addition, the insulating gap space 102 may communicate with a space in which the heating module 50 is disposed and with an inner space of the handle 40. Therefore, although not shown, an electric wire connected to the handle PCB located in the handle 40 may be guided to the space in which the heating module 50 is disposed through the insulating gap space 102 between the outer body 11 and the inner body 12.

The body 10 may be formed by joining upper ends of the outer body 11 and the inner body 12 and lower ends of the outer body 11 and the inner body 12 formed in cylindrical shapes.

For example, the upper end and lower end of the outer body 11 and the upper end and lower end of the inner body 12 may be respectively connected to each other by welding while overlapping each other. At this time, in the remaining portion except for the upper and lower ends, the outer body 11 and the inner body 12 may be spaced apart from each other by a predetermined interval to have a heat insulating structure.

To describe the structure of the upper end of the body 10 in more detail, the upper end of the outer body 11 and the upper end of the inner body 12 are coupled to each other and fixed by welding or the like.

As shown, an inner upper end portion 121 extending outwardly is further provided at the upper end of the inner body 12 so that the upper end of the outer body 11 and the upper end of the inner body 12 are coupled to each other.

The inner upper end portion 121 is formed to be double-extended to the outside from the inner body 12 so that the outer end thereof comes into contact with the upper end of the outer body 11.

Accordingly, the upper portion of the gap space 102 is shielded by the inner upper end portion 121. Of course, it will also be possible to form the upper end of the outer body 11 so as to extend inward and contact the upper end of the inner body 12.

The handle 40 and the water outlet assembly 30 are coupled to the body 10.

To be specific, the handle 40 and the water outlet assembly 30 may be fastened to the upper end of the inner body 12, and the handle 40 and the water outlet assembly 30 may penetrate the outer body 11 and protrude outward.

Accordingly, a handle hole 111 through which the handle 40 is installed and a water outlet assembly hole 112 through which the water outlet assembly 30 is installed are respectively formed in the outer body 11.

To be specific, the handle hole 111, which is a rectangular cut-out hole, is formed in the upper right side of the outer body 11 to be passed through left and right.

In addition, on the opposite side of the handle hole 111, the water outlet assembly hole 112 is formed to be passed through left and right. That is, the water outlet assembly hole 112 is formed at the upper end of the left side of the outer body 11, and the water outlet assembly hole 112 preferably has a triangular shape to correspond to the shape of the water outlet assembly 30.

In the front surface of the outer body 11 and the front surface of the inner body 12, an outer hole 113 and an inner hole 123 are respectively formed to be passed through back and forth.

The outer hole 113 and the inner hole 123 are portions in which a viewing window 13 to be described below is installed. Therefore, it is preferable that the outer hole 113 and the inner hole 123 have a rectangular shape elongated vertically to correspond to the shape of the viewing window 13.

A plurality of water outlet holes 125 are formed to be passed through on the upper left side of the inner body 12. The water outlet holes 125 are a part that guides the water inside the inner body 12 to be discharged through the water outlet 30. Accordingly, the plurality of water outlet holes 125 are preferably formed at positions corresponding to the water outlet assembly holes 112 formed in the upper left side of the outer body 11.

In addition, the plurality of water outlet holes 125 are formed to have a predetermined diameter, and serve as a filter to filter out debris from the contents inside the body 10. That is, the water outlet hole 125 is formed of a hole having a small diameter, so that substances larger than the water outlet hole 125 are filtered and not discharged to the outside through the water outlet assembly 30.

As described above, in the present disclosure, the plurality of water outlet holes 125 perform a filter function of filtering out foreign substances discharged through the water outlet assembly 30, and this filter function is formed integrally with the body 10, more specifically, the inner body 12.

The water outlet hole 125 is preferably formed in the body 10 or the inner body 12 in plurality, and the plurality of water outlet holes 125 may be disposed vertically spaced apart from each other.

In addition, the number of water outlet holes 125 disposed above the body 10 or inner body 12 may be greater than the number of water outlet holes 125 punched below. In other words, the number of water outlet holes 125 placed at the same height may increase from the lower part of the body 10 or the inner body 12 to the upper part, and the plurality of water outlet holes 125 may be arranged in an inverted triangle shape.

In this way, when the plurality of water outlet holes 125 are arranged in an inverted triangle shape, the shape corresponds to the outer shape of the right end of the water outlet assembly 30. Moreover, when pouring water from the electric kettle, the amount of water discharged proportionally increases according to the angle of inclination, so the convenience of use may be increased.

The handle bracket 15 is installed on the upper right side of the inner body 12. The handle bracket 15 is such that the handle 40 is coupled to and fixed to the inner body 12, and is preferably formed in a '⊐' shape (when viewed from above).

Accordingly, the left end of the handle bracket 15 is coupled to the inner body 12 by welding, an adhesive, or a fastening mechanism, and the right end of the handle bracket 15 is coupled to the handle 40.

When the handle bracket 15 is fixedly mounted on the inner body 12, it is desirable that the right end of the handle bracket 15 is exposed to the outside (right side) through the handle hole 111 of the outer body 11 as shown.

In addition, the handle 40 may be fastened to the handle bracket 15 by fastening means. That is, the handle 40 may be coupled to the handle bracket 15 by fastening means such as a bolt and a nut.

The body 10 is formed of a stainless steel material, and is formed by processing such as welding. Accordingly, in the case of the body 10, the processing area is smoothed by electropolishing, and the surface of the internal space in which water is accommodated may be maintained in a smooth state.

In addition, the body 10 may be subjected to electropolishing so that the inner and outer surfaces have corrosion resistance. For this reason, it is preferable that the body 10 be electropolished after the inner body 12 and the outer body 11 are combined.

In a state in which the inner body 12 and the outer body 11 are coupled to each other and the body 10 is molded, the body 10 is immersed in an electrolyte solution for electropolishing, and then the electropolishing is performed.

In this process, the electrolyte solution is inevitably introduced into the insulating gap space 102 between the inner body 12 and the outer body 11 due to the structural characteristics of the body 10. That is, since the body 10 has the handle hole 111 and the water outlet assembly hole 112 open in the molded state, when the body 10 is immersed in the electrolyte solution, the electrolyte solution inevitably flows between the inner body 12 and the outer body 11.

When the body 10 is lifted after the electropolishing is completed, the electrolyte solution between the inner body 12 and the outer body 11 is discharged to the lower side of the gap space 102. That is, since the lower ends of the inner body 12 and the outer body 11 do not contact each other and form a space in which the bottom assembly 56 and the like are coupled, the electrolyte solution may be smoothly discharged below the gap space 102 before parts such as the bottom assembly 56 are combined.

In addition, even when the body 10 is washed after the electropolishing is completed, when the body 10 is immersed in a washing solution and then lifted, the electrolyte solution between the inner body 12 and the outer body 11 is naturally discharged downward through the gap space 102.

In this way, all of the remaining liquid in the body 10 may be smoothly discharged even when the electrolyte solution is removed after the electropolishing process as well as being washed after the electropolishing.

The viewing window 13 may be formed on the body 10. The viewing window 13 makes it possible to check the water level or the boiling state of water inside the electric kettle 1 from the outside of the electric kettle 1 without opening the lid 20.

The viewing window 13 may extend long in the vertical direction, and may be fixedly mounted to the inner body 12 and the outer body 11, respectively. Preferably, the viewing window 13 is coupled to the inner body 12.

The viewing window 13 allows a user to see the inside of the body 10 from the outside, so that the user may know the amount of food or water inside the body 10, and is preferably formed to be transparent.

It is preferable that a viewing window gasket 135 is further provided between the viewing window 13 and the body 10 to prevent water leakage through the gap between the viewing window 13 and the body 10. That is, the viewing window 13 may be mounted on the body 10 in an airtight state.

In this way, the viewing window gasket 135 may be mounted between the viewing window 13 and the inner hole 123 or the outer hole 113. Preferably, the viewing window gasket 135 is mounted between the inner hole 123 and the viewing window 13 to prevent water inside the inner body 12 from leaking.

The viewing window gasket 135 is preferably formed in a shape corresponding to the circumferential shape of the viewing window 13, and is preferably made of an elastic material.

When the viewing window 13 is fixedly mounted to the inner hole 123 of the inner body 12, the inner surface of the viewing window 13 is preferably located on the same plane as the inner surface of the inner body 12.

Accordingly, in a state in which the viewing window 13 is fixedly mounted to the body 10, there is no protruding portion on the inside of the inner body 12, thereby making the internal structure simple and easy to clean.

In addition, it is preferable that the front surface of the viewing window 13 is also configured to be positioned on the same plane as the outer surface of the outer body 11. Accordingly, in a state in which the viewing window 13 is mounted, the viewing window 13 does not protrude or sink from the outer surface of the outer body 11, so that the appearance may be further improved.

The gap between the viewing window 13 and the inner body 12 is sealed by the viewing window gasket 135 to prevent the water inside the body 10 from leaking to the outside.

Of course, additional gaskets or packings may be further provided on the outer body 11 and the like as needed, and the space between the outer body 11 and the viewing window 13 may be more airtight so that a gap is not generated between the outer body 11 and the viewing window 13.

The heating module 50 may be mounted on a lower portion of the body 10. That is, the heating module 50 is mounted at the bottom of the inner body 12.

The heating module 50 is for heating the space inside the body 10 to increase and control the temperature of contents such as water.

The heating module 50 consists of: the heater assembly 51 for generating heat; the temperature sensor assembly 53 for measuring the temperature of water inside the inner body 12; and the upper power module 55 for supplying power to the heater assembly 51.

The bottom assembly 56 is further provided on the lower side of the heating module 50 to cover the remaining components except for a part of the upper power module 55 so as not to be exposed downward of the body 10.

The heating module 50 and the bottom assembly 56 are mounted through the open lower surface of the outer body 11, and form at least a part of the lower portion of the body 10, so they may be collectively referred to as a "bottom body".

In addition, in a state in which the assembly of the bottom body is completed, the body 10 may be seated on the base 60. That is, for the operation of the electric kettle 1, the body 10 with the bottom body assembled needs to be seated on the base 60.

When the body 10 is seated on the base 60, the upper power module 55 of the body 10 and the lower power module 64 of the base 60 are in contact with each other, so that supplying power becomes possible. In such a state, the heater 54 is heated by supplying power to boil water.

As shown, the heating module 50 may be disposed inside the open lower surface of the outer body 11. When the bottom assembly 56 is separated, the remaining components of the heating module 50 may be exposed through the open lower surface of the outer body 11.

The heater assembly 51 may include the heating plate 52 attached and coupled to the bottom of the inner body 12, and the heater 54 fixedly mounted to the bottom of the heating plate 52.

To be specific, the upper power module 55 is disposed in the center of the lower portion of the body 10, and the heater 54 is provided outside the upper power module 55 to heat the bottom surface of the inner body 12.

In addition, a bottom PCB for supplying power to the heater 54 may be provided in the bottom assembly 56.

As such, the upper power module 55 is located in the center of the heating module 50. Also, the upper power module 55 may be mounted in the center of the heating plate 52.

The heating plate 52 may be coupled to the lower surface of the inner body 12, and the heater 54 may be mounted on the heating plate 52.

The heater 54 may be configured as a sheath heater. The heater 54 is located more outside than the upper power module 55, and may be arranged along the circumference of the heating plate 52.

Opposite ends of the heater 54 are spaced apart from each other at adjacent positions, and it is preferable that connection terminals are exposed at the spaced-apart opposite ends of the heater so as to be connected to the bottom PCB by wires.

The heating plate 52 may be formed in a disk shape having a size corresponding to the size of the lower surface of the inner body 12, and the heater 54 may be mounted on the bottom surface of the heating plate 52.

The heating plate 52 is formed of aluminum or an aluminum alloy material having high thermal conductivity so that the heat of the heater 54 may be uniformly transmitted to the entire bottom surface of the inner body 12. The heating plate 52 and the heater 54 may be integrally formed by die casting.

A temperature sensor mounting hole 521 in which the temperature sensor assembly 53 is mounted may be further formed in the heating plate 52.

A sensor packing 531 may be further provided in the temperature sensor mounting hole 521. This sensor packing 531 seals the temperature sensor mounting hole 521.

The heating plate 52 may be mounted on the lower surface of the inner body 12. At this time, the heating plate 52 may be completely in close contact with the lower surface of the inner body 12, and the heating plate may be brazed so as to effectively transfer heat and may be integrally combined with the inner body 12.

The heating plate 52 may have a circular disk shape, and may have a slightly smaller diameter than that of the inner body 12.

A sensor hole 124 through which the upper end of the temperature sensor assembly 53 is exposed is formed on the bottom surface of the inner body 12 to be penetrated vertically.

The sensor hole 124 is formed at a position corresponding to the temperature sensor mounting hole 521 vertically.

The temperature sensor assembly 53 is exposed above the bottom surface of the inner body 12 to sense the temperature of water in the heating space 101.

Meanwhile, the top height of the temperature sensor assembly 53 is installed to have a height corresponding to the height of the bottom surface of the inner body 12, and it is preferable that the gap between the temperature sensor assembly 53 and the inner body 12 is sealed by the sensor packing 531.

Accordingly, the upper end of the temperature sensor assembly 53 does not protrude upward from the bottom surface of the inner body 12, and thus, even when cleaning the inside of the body 10, the temperature sensor assembly 53 is not interfered with.

Meanwhile, all other components of the heating module 50 except for the bottom assembly 56 may be completely accommodated inside the body 10. When the bottom assembly 56 is installed, the remaining components of the heating module 50 provided inside the body 10 are shielded and the lower exterior of the body 10 is formed.

A bottom hole 561 is formed in the center of the bottom assembly 56, and a portion of the upper power module 55 may be exposed through the bottom hole 561.

Accordingly, by being exposed through the bottom hole 561, the upper power module 55 is configured to be in contact with the lower power module 64 when the body 10 is mounted on the base 60.

Hereinafter, the lower configuration of the body 10 will be described in detail.

Figure 8:
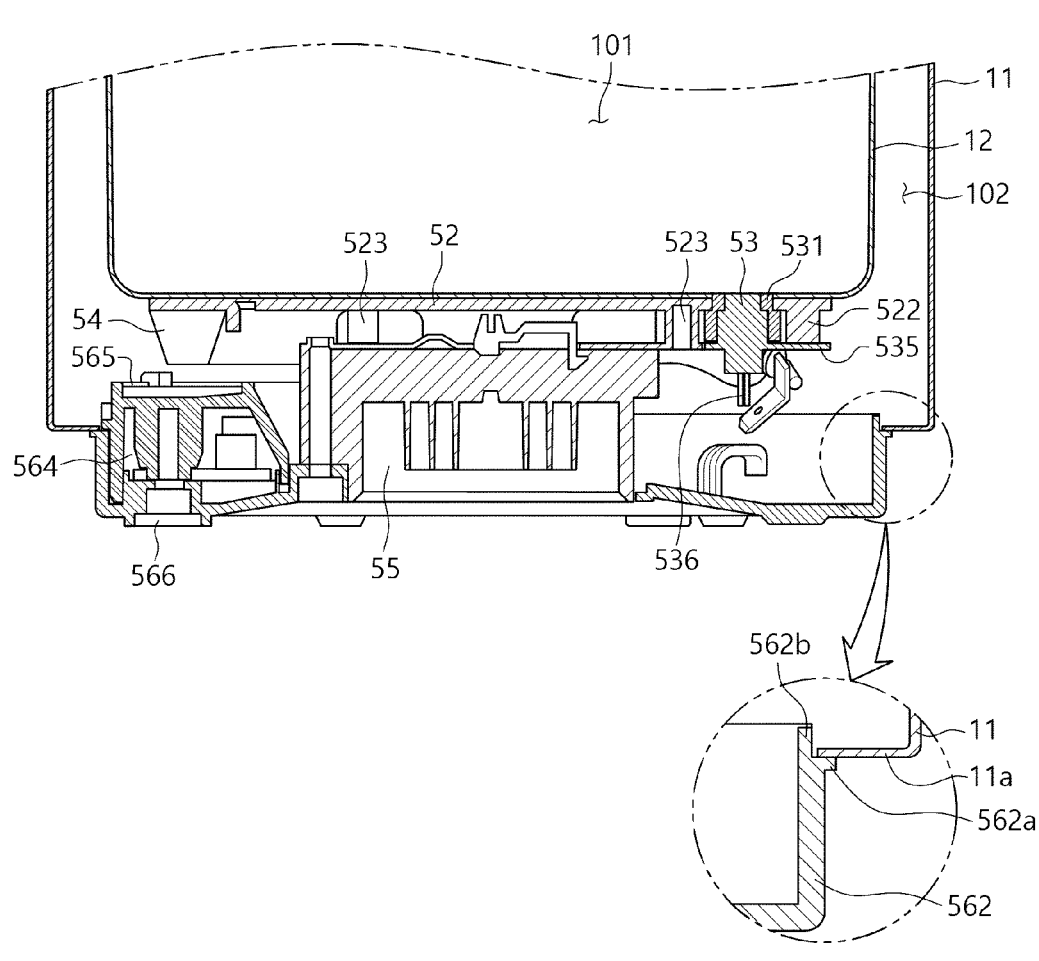
FIG. 8 is a partial cross-sectional view showing the configuration of the lower end of the body constituting the embodiment of the present disclosure.
Figure 9:
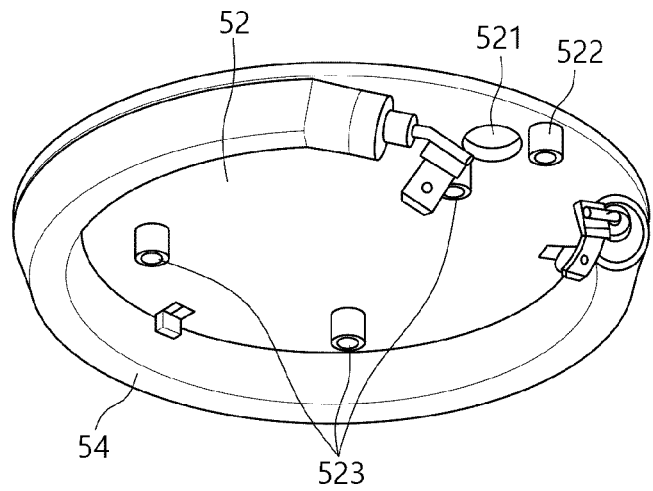
FIG. 9 is a lower perspective view showing a detailed configuration of a heater assembly constituting the embodiment of the present disclosure.
Figure 10:
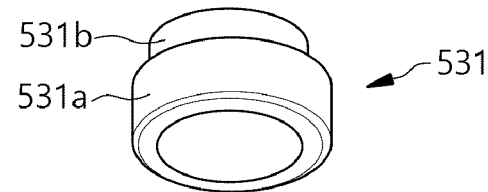
FIG. 10 is a perspective view showing the configuration of the first embodiment of a temperature sensor assembly and a sensor packing constituting the embodiment of the present disclosure.
Figure 10:
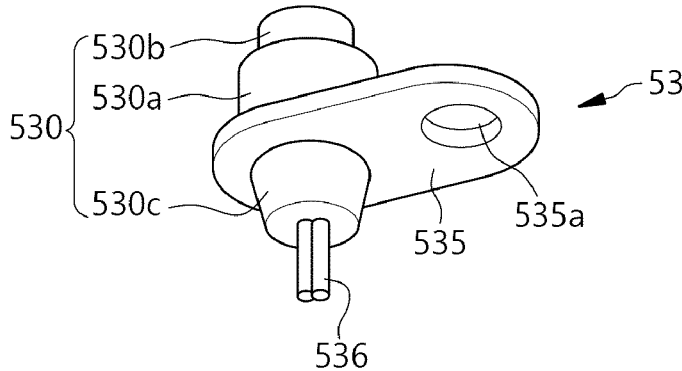
Figure 11:
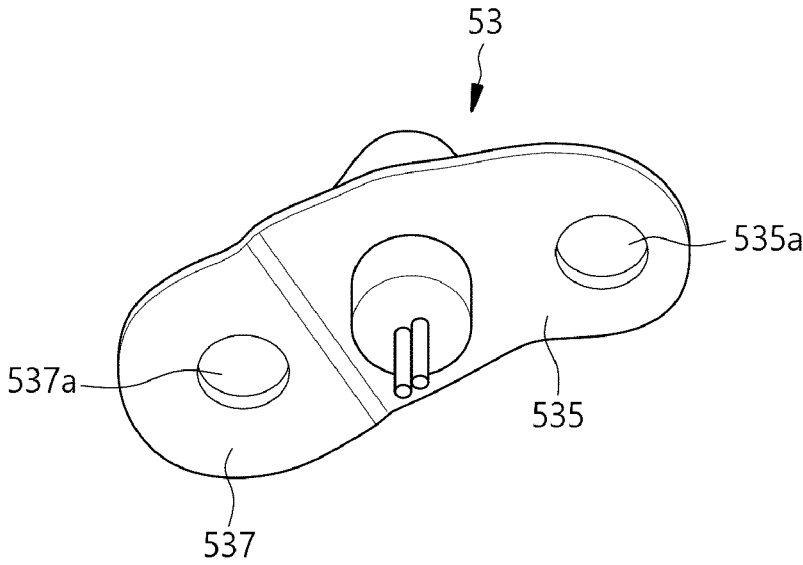
FIG. 11 is a perspective view showing the configuration of the second embodiment of the temperature sensor assembly constituting the embodiment of the present disclosure.
Figure 12:
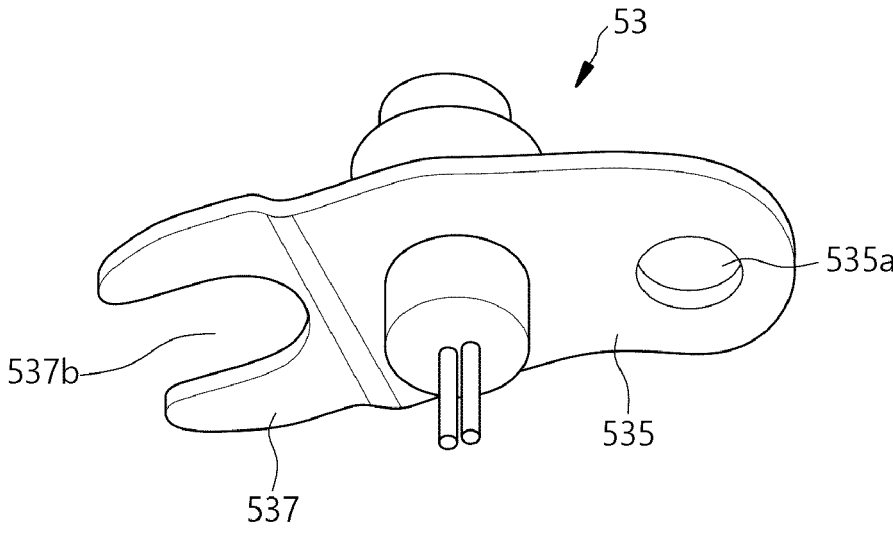
FIG. 12 is a perspective view showing the configuration of the third embodiment of the temperature sensor assembly constituting the embodiment of the present disclosure.
Figure 13:
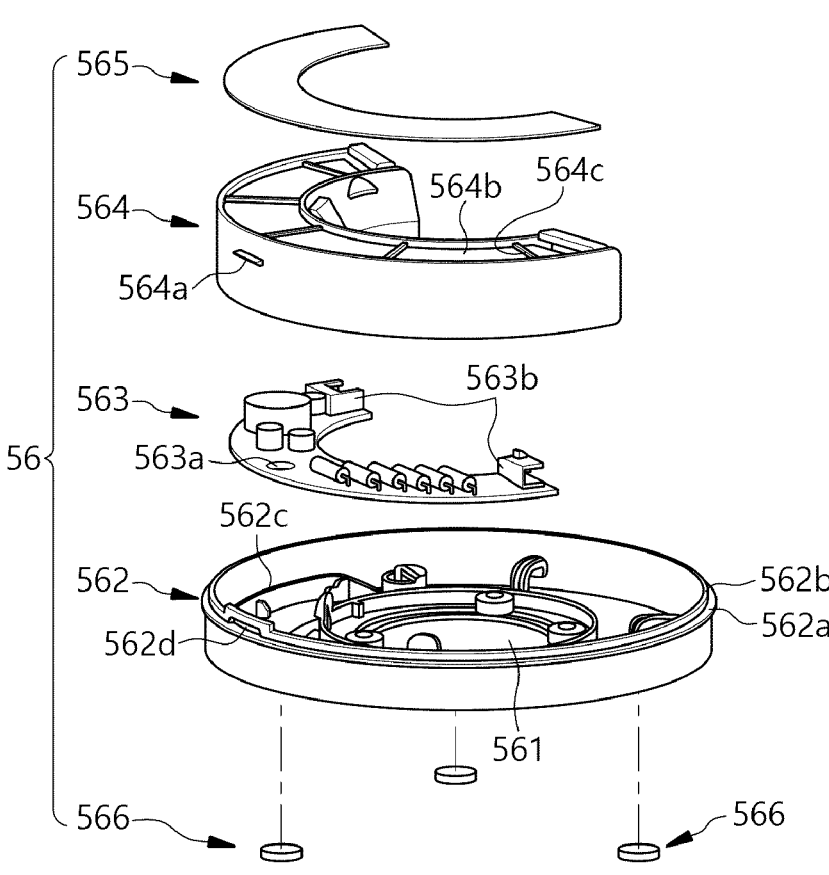
FIG. 13 is an exploded perspective view showing the detailed configuration of a bottom assembly constituting the embodiment of the present disclosure.

FIGS. 8 to 13 show the configuration and components of the lower end of the body 10. That is, FIG. 8 is a partial cross-sectional view showing the configuration of the lower end of the body 10, FIG. 9 is a lower perspective view showing a detailed configuration of the heater assembly 51, FIG. 10 is a perspective view showing the configuration of the first embodiment of a temperature sensor assembly 53 and a sensor packing 531. In addition, FIGS. 11 and 12 are perspective views showing the configuration of the second embodiment and the third embodiment of the temperature sensor assembly 53, respectively, and FIG. 13 is an exploded perspective view showing the detailed configuration of a bottom assembly 56.

As shown in these drawings, the lower end of the body 10 is provided with the heating module 50 and the like for heating the space inside the body 10 to increase and control the temperature of the contents, and the heating module 50 is provided with the bottom assembly 56 and the like for controlling the operation or heat of the heater 54 and blocking external exposure of the heater 54.

To be specific, the bottom assembly 56 includes: a body bottom 562 forming the lower exterior of the body 10; a bottom PCB 563 for supplying power to the heater 54 of the heating module 50; a bottom PCB cover 564 provided on the above of the body bottom 562 to surround and protect the bottom PCB 563; and a blocking member 565 provided above the bottom PCB cover 564 to block the heat from the heater 54 of the heating module 50 from being transmitted to the bottom PCB 563.

As such, the bottom assembly 56 may further include the bottom PCB 563 for supplying power to the heater 54, and the blocking member 565 for blocking the heat from the heater 54 from being transmitted to the bottom PCB 563.

The body bottom 562 preferably has a circular rim shape as shown, and the bottom hole 561 is formed therein and the bottom PCB 563 is mounted therein.

The body bottom 562 is coupled to the lower end of the outer body 11.

Preferably, the diameter of the body bottom 562 is smaller than the diameter of the outer body 11. Accordingly, the body bottom 562 is coupled to an outer bottom surface 11a forming the bottom of the outer body 11.

Meanwhile, it is preferable that the upper end of the body bottom 562 is located above the lower end of the outer body 11. This is to block the water inside the outer body 11 from flowing into the body bottom 562 even when water penetrates into the outer body 11.

To be specific, at the upper end of the side of the body bottom 562, a horizontal frame 562a that is vertically bent sideward to support the outer bottom surface 11a of the outer body 11, and a vertical frame 562b extending upward from the inner circumferential surface of the body bottom 562 and protruding higher than the horizontal frame 562a are formed.

The outer bottom surface 11a of the outer body 11 is placed on the upper surface of the horizontal frame 562a and is coupled. In this way, since the upper end of the vertical frame 562b is located higher than the outer bottom surface 11a, water introduced between the outer body 11 and the inner body 12 may not enter the body bottom 562.

The body bottom 562 may further include a PCB seating end 562c on which the bottom PCB 563 is mounted.

In addition, a cover protrusion 564a and a cover protrusion hole 562d may be formed in the bottom PCB cover 564 and the body bottom 562 to have a shape corresponding to each other and to be coupled to each other.

As shown in the present disclosure, a case in which the cover protrusion 564a protruding to the outside is formed on the side surface of the bottom PCB cover 564, and the cover protrusion hole 562d having a size corresponding to that of the cover protrusion 564a is formed at the upper end of the body bottom 562 is illustrated.

The bottom PCB 563 is mounted on the body bottom 562.

The bottom PCB 563 may function to supply power to the heater 54 or to control power supplied to the heater 54.

In addition, the bottom PCB 563 may be configured to have various other functions. For example, a buzzer or a speaker may be provided, so that when an operation notification of the electric kettle according to the present disclosure is required, a beep sound may be output to inform the operation state. Also, when the power is applied by seating the body 10 in the assembled state on the base 60, the buzzer or the speaker may output a notification sound, so that a user may recognize that the electric kettle is in operation condition without checking the display separately.

Furthermore, a boss hole 563a may be formed to be passed through vertically in the bottom PCB 563, and the boss hole 563a allows a boss (not shown) formed on the body bottom 562 or bottom PCB cover 564, etc. to penetrate and be coupled, so that the bottom PCB 563 is firmly coupled to the body bottom 562 and the like.

In addition, at each end of the bottom PCB 563, a PCB terminal 563b for supplying power may be formed, respectively.

It is preferable that the bottom PCB cover 564 is formed so as to cover both the top and sides of the bottom PCB 563 by opening the lower part as shown.

A member seating groove 564b in which the blocking member 565 is seated is formed on the upper surface of the bottom PCB cover 564 to be depressed downward. That is, as shown, the member seating groove 564b having a shape corresponding to that of the blocking member 565 is formed on the upper surface of the bottom PCB cover 564, and the blocking member 565 is seated and coupled to the member seating groove 564b.

It is preferable that one or more separation ribs 564c for supporting the blocking member 565 are formed in the member seating groove 564b. That is, as shown, a plurality of separation ribs 564c are formed in the member seating groove 564b to have a predetermined height, and these separation ribs 564c support the blocking member 565 to be mounted in the member seating groove 564b, while also allowing the blocking member 565 to be spaced apart by a predetermined distance.

As described above, on the side surface of the bottom PCB cover 564, a cover protrusion 564a is formed to protrude outward, and two or more of these cover protrusions 564a may be formed. Of course, when two or more cover protrusions 564a are formed, two or more cover protrusion holes 562d should also be formed.

The blocking member 565 is mounted on the upper surface of the bottom PCB cover 564, as shown, and the blocking member 565 is preferably configured to have a shape corresponding to that of the bottom PCB 563.

The blocking member 565 serves to prevent the heat from the heater 54 installed on the upper side from being transmitted downward, thereby preventing the bottom PCB 563 from malfunctioning or being damaged by heat. Of course, the blocking member 565 also serves to prevent a user from sensing heat or injuring his or her hand by the heat of the heater 54 being transmitted to the lower side of the body bottom 562.

Accordingly, it is preferable that the blocking member 565 is made of a material that is strong against heat or electricity and effectively blocks heat, etc. That is, the blocking member 565 may be formed of a mica sheet having excellent electrical and thermal properties.

One or more bottom dampers 566 may be further provided on the bottom surface of the body bottom 562. The present disclosure exemplifies a case in which three bottom dampers 566 are provided at equal intervals, and it is preferable that the bottom damper 566 is made of an elastic material, etc. to support the body bottom 562 and prevent slipping, etc.

Meanwhile, as described above, the heating module 50 includes: the heating plate 52 configured to form the bottom surface inside the body 10 or to be in close contact with the bottom surface of the body 10; the heater 54 fixedly mounted on the bottom of the heating plate 52; the upper power module 55 for supplying power to the heater assembly 51; the temperature sensor assembly 53 for measuring the temperature of water inside the body 10.

The temperature sensor assembly 53 is mounted on the heating plate 52.

Accordingly, the heating plate 52 has a sensor fixing end 522 to which the temperature sensor assembly 53 is fixedly mounted, and a module fixing end 523 to which the upper power module 55 is mounted.

To be specific, as described above, a temperature sensor mounting hole 521 in which the temperature sensor 530 is mounted is formed vertically through the heating plate 52 having a disk shape, and on the right side (in FIG. 9) of the temperature sensor mounting hole 521, the sensor fixing end 522 is formed to protrude downward from the bottom of the heating plate 52 to a predetermined height.

The module fixing end 523 is formed to have a height corresponding to that of the sensor fixing end 522 on the left side (in FIG. 9) and two spaced-apart places of the temperature sensor mounting hole 521.

The temperature sensor assembly 53 consists of: a temperature sensor 530 for measuring the temperature inside the body 10; and a sensor fastening plate 535 for supporting the temperature sensor 530 to be fixed to the heating plate 52.

In addition, as described above, a temperature sensor mounting hole 521 in which the temperature sensor 530 is mounted is further formed in the heating plate 52, and a sensor packing 531 for sealing a gap between the temperature sensor 530 and the temperature sensor mounting hole 521 is further provided in the temperature sensor mounting hole 521.

On the bottom surface of the inner body 12, a sensor hole 124 through which the upper end of the temperature sensor 530 is exposed is formed to be passed through vertically, and the upper surface of the temperature sensor 530 installed in the sensor hole 124 is installed to have the same plane as the bottom surface of the inner body 12. That is, as described above, it is preferable that the upper end of the temperature sensor 530 is installed so as not to protrude upward from the bottom surface of the inner body 12.

As described above, this is to prevent the temperature sensor 530 from interfering with the body 10 during internal cleaning and washing.

The temperature sensor 530 includes: a sensor body 530a forming the body; a sensor upper end portion 530b formed to protrude upward from the sensor body 530a and is inserted into the sensor hole 124; and a sensor lower end portion 530c protruding downward of the sensor body 530a and exposed under the sensor fastening plate 535.

The sensor body 530a, the sensor upper end portion 530b, and the sensor lower end portion 530c are preferably formed to have a cylindrical shape, as shown, and the outer diameters of the sensor upper end portion 530b and the sensor lower end portion 530c are preferably smaller than the outer diameter of the sensor body 530a.

A power line 536 may be connected to the sensor lower end portion 530c.

The sensor packing 531 has a shape corresponding to the shape of the upper half of the temperature sensor 530 and is configured to surround the upper half of the temperature sensor 530.

To be specific, the sensor packing 531 is formed to have a hollow ring shape, and is made of a material having elasticity to perform a sealing function.

In addition, as shown, the sensor packing 531 includes: a packing body 531a formed to be stepped to surround the side surface of the sensor body 530a; and a packing insertion part 531b integrally extended on the upper side of the packing body 531a and enclosing the side surface of the sensor upper end portion 530b.

The packing insertion part 531b is formed to have an outer diameter smaller than the outer diameter of the packing body 531a, and is inserted into the temperature sensor mounting hole 521 of the heating plate 52. Accordingly, the sensor packing 531 prevents water flow through the gap between the temperature sensor 530 and the temperature sensor mounting hole 521.

The sensor fastening plate 535 may be configured to be fastened to the heating plate 52 by two or more fastening members as in the first embodiment of the temperature sensor assembly 53 shown in FIG. 10, or may be configured to be fastened to the heating plate 52 by two or more fastening members as in the second and third embodiments shown in FIGS. 11 and 12.

As in FIG. 11, the sensor fastening plate 535 may be fixedly mounted on the lower side of the heating plate 52 by one fastening member such as a fastening bolt. At this time, as shown, the sensor fastening plate 535 has one sensor fastening hole 535a through which a fastening member such as a fastening bolt passes.

Meanwhile, as in FIGS. 11 and 12, when the temperature sensor assembly 53 is mounted on the heating plate 52 by two or more fastening members, an auxiliary fastening plate 537 is further formed on the sensor fastening plate 535.

To be specific, the auxiliary fastening plate 537 extending from the sensor fastening plate 535 to one side (left in FIGS. 11 and 12) is further formed on the sensor fastening plate 535.

It is preferable that the auxiliary fastening plate 537 is coupled to the module fixing end 523. Accordingly, the auxiliary fastening plate 537 is preferably formed to have a different height from the sensor fastening plate 535. That is, since the upper end of the upper power module 55 is fastened to the module fixing end 523, the auxiliary fastening plate 537 is preferably bent so as to have a higher position or a lower position than the sensor fastening plate 535 in order to overlap and combine with the upper end of the upper power module 55.

An auxiliary fastening hole 537a corresponding to the sensor fastening hole 535a through which a fastening member passes is further formed in the auxiliary fastening plate 537 as in the sensor fastening plate 535.

The auxiliary fastening hole 537a may be formed of a circular hole like the sensor fastening hole 535a, but as shown in FIG. 12, may be formed of an auxiliary fastening groove 537b having one side (left side in FIG. 12) opened.

In this way, when the auxiliary fastening groove 537b is formed in the auxiliary fastening plate 537, fastening is possible by inserting the auxiliary fastening plate 537 into the module fixing end 523 without completely removing the fastening member fastened to the module fixing end 523.

As such, when the temperature sensor assembly 53 is fastened to the heating plate 52 by two or more fastening members, the movement of the temperature sensor assembly 53 is prevented, and the sealing is more robust compared to the case where fastening is done by a single fastening member.

Hereinafter, various embodiments of the water outlet assembly 30 will be described.

It is preferable that the water outlet assembly 30 has one or more elements, and has a structure in which a gap with the body 10 is blocked to prevent water leakage. That is, the water outlet assembly 30 may be composed of one single body or composed of two or more pieces, and it is preferable that the water outlet assembly 30 has a structure in which a rubber packing, etc. is provided to prevent liquid including water discharged through the water outlet assembly 30 from leaking through a gap, or the water outlet assembly 30 is configured to fill the gap with a sealing member such as a sealant.

Therefore, hereinafter, various structures of the water outlet assembly 30 will be described in detail. In addition, descriptions of overlapping parts and functions will be omitted.

Figure 14:
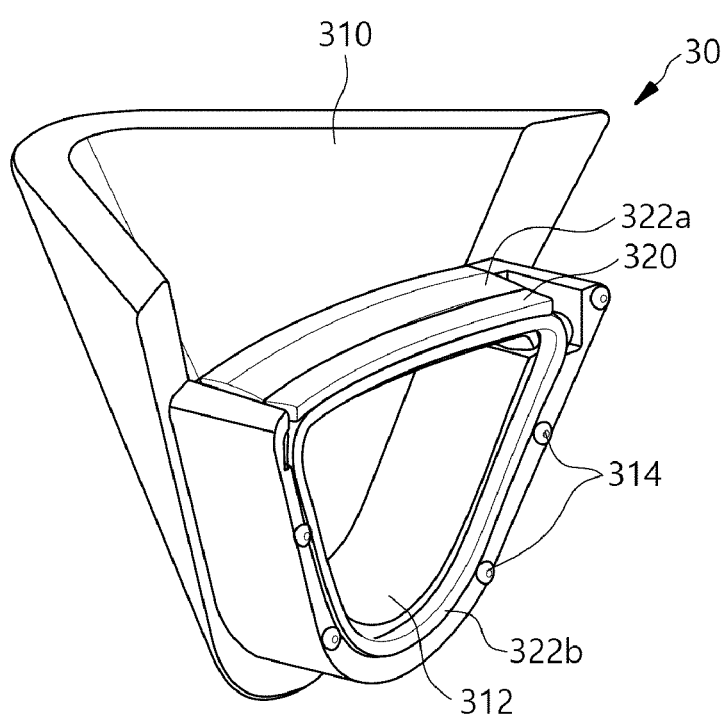
FIG. 14 is a perspective view showing the configuration of the first embodiment of a water outlet assembly constituting the embodiment of the present disclosure.
Figure 15:
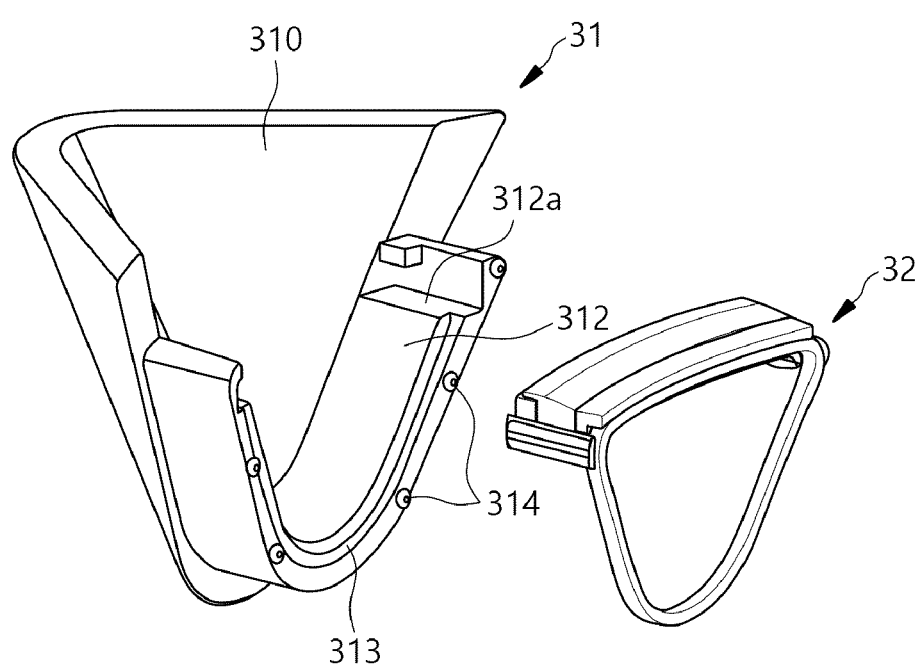
FIG. 15 is an exploded perspective view showing the configuration of the first embodiment of the water outlet assembly constituting the embodiment of the present disclosure.
Figure 16:
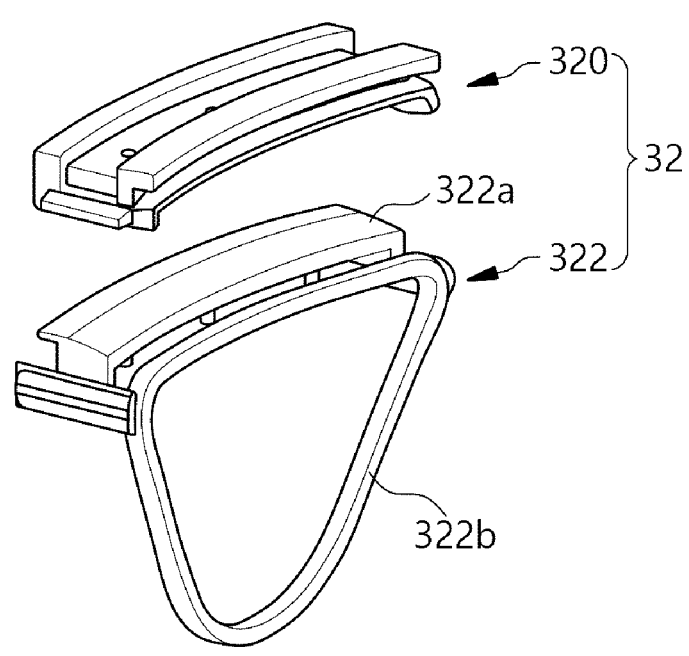
FIG. 16 is an exploded perspective view showing the detailed configuration of a packing body of the first embodiment of the water outlet assembly constituting the embodiment of the present disclosure.
Figure 17:
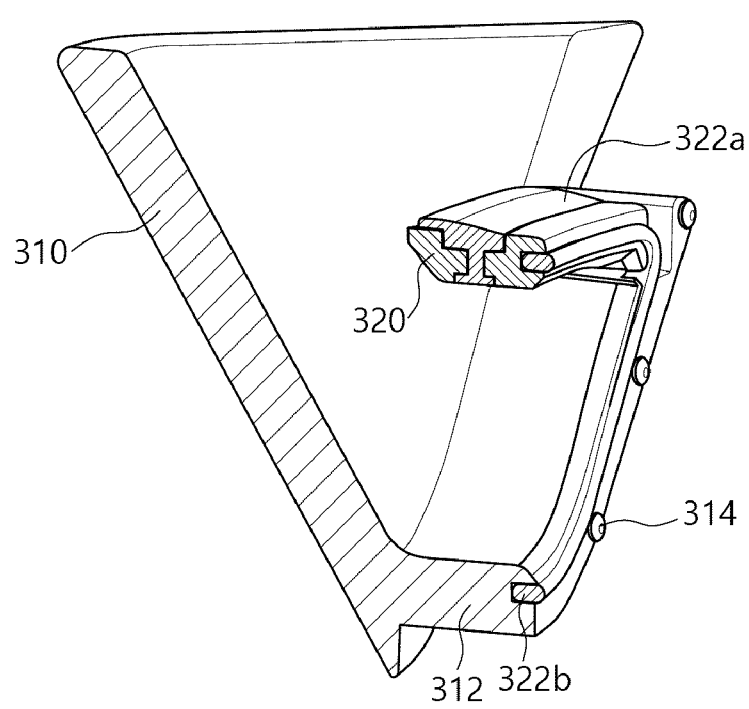
FIG. 17 is a left and right cut-away perspective view showing the internal configuration of the first embodiment of the water outlet assembly constituting the embodiment of the present disclosure.
Figure 18:
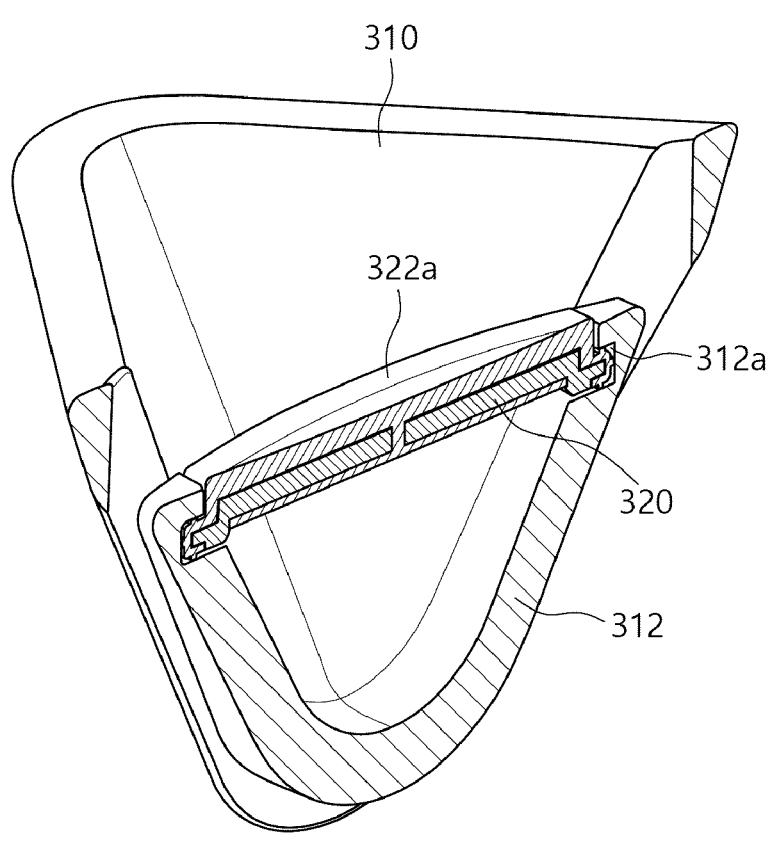
FIG. 18 is a front and rear cut-away perspective view showing the internal configuration of the first embodiment of the water outlet assembly constituting the embodiment of the present disclosure.
Figure 19:
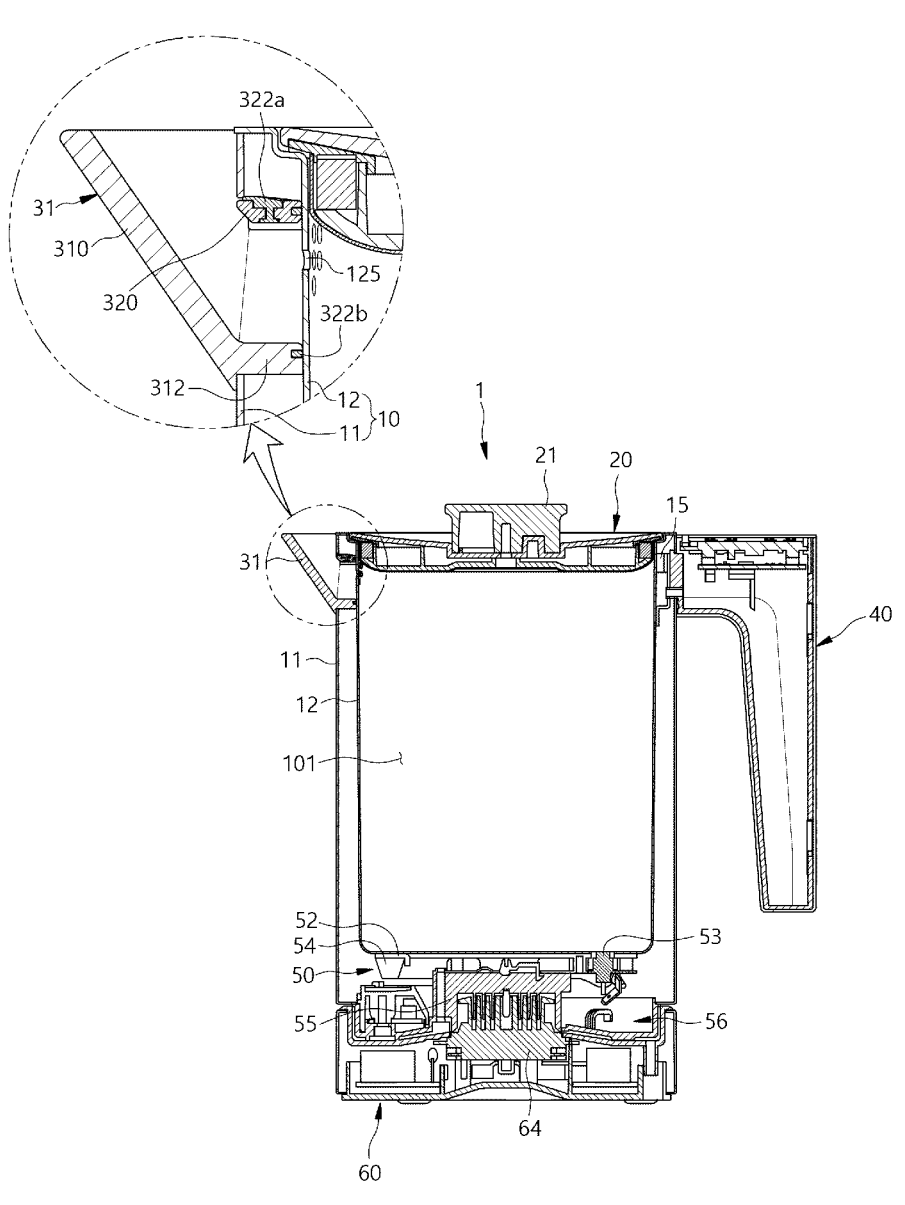
FIG. 19 is a side cross-sectional view showing a state in which the first embodiment of the water outlet assembly constituting the embodiment of the present disclosure is mounted on the body.

First, the configuration of the first embodiment of the water outlet assembly 30 is shown in FIGS. 14 to 19. That is, FIGS. 14 and 15 are a perspective view and an exploded perspective view, respectively, showing the configuration of the first embodiment of the water outlet assembly 30. FIG. 16 is an exploded perspective view showing the configuration of the packing body of the first embodiment of the water outlet assembly 30, and FIGS. 17 and 18 are cut-away perspective views of the left and right and front and rear directions, respectively, showing the internal configuration of the first embodiment of the water outlet assembly 30. FIG.

19 is a side cross-sectional view showing the first embodiment of the water outlet assembly 30 mounted on the body 10.

As shown in these drawings, the water outlet assembly 30 includes: a water outlet 31 which is installed to protrude sideward from the body 10 and guides liquid inside the body 10 to be discharged outside; and a packing body 32 provided on a side of the water outlet 31 to shield a gap between the water outlet 31 and the body 10.

To be specific, the water outlet assembly 30 consists of two pieces: the water outlet 31 which is installed to protrude sideward from the body 10 and guides liquid such as water inside the body 10 to be discharged outside; and the packing body 32 that blocks water from leaking through the gap between the water outlet 31 and the body 10.

The water outlet 31 includes: a water outlet body 310 as a path for water; and a water outlet coupling end 312 coupled to the body 10.

The water outlet body 310 is configured to allow the flow of water by forming a groove on the inside as shown, and on one side (right side in FIG. 15) of the water outlet body 310, the water outlet coupling end 312 that is accommodated in and coupled to the body 10 is formed.

The water outlet coupling end 312 is formed to protrude from the right end (in FIG. 15) of the water outlet body 310 to the right, and is formed to have a predetermined width. The water outlet coupling end 312 has an arc shape corresponding to the right end (in FIG. 15) of the water outlet body 310 as shown. That is, the water outlet coupling end 312 is made of a flat plate having a predetermined thickness, and has a circular arc shape with a central portion recessed downward and convexly protruding downward.

In addition, the water outlet coupling end 312 is formed to have a shape with an upper width greater than a lower width as shown. Accordingly, the shape of the water outlet coupling end 312 and a plurality of water outlet holes 125 formed in an inverted triangular shape on the inner body 12 correspond to each other, so that water passing through the water outlet holes 125 is smoothly discharged through the water outlet.

A packing fixing end 312a to which one end of the packing body 32 is fixedly mounted is formed at each end of the water outlet coupling end 312. That is, the packing fixing end 312a made of a groove of a predetermined size is formed at the upper end of the front and rear (in FIG. 15) of the water outlet coupling end 312, and the upper end of the packing body 32 is seated and coupled to the packing fixing end 312a.

At one end of the water outlet coupling end 312, a packing seating groove 313 in which a packing portion 322b to be described below is seated is formed to be depressed to one side. That is, as shown, at the right end (in FIG. 15) of the water outlet coupling end 312, a packing seating groove 313 of a predetermined depth recessed to the lower and left sides is formed, and the packing portion 322b of the packing body 32 to be described below is inserted and seated in the packing seating groove 313.

On one surface of the water outlet coupling end 312, a plurality of welding protrusions 314 are formed to protrude outward. That is, as shown, a plurality of welding protrusions 314 are formed to protrude to the right on the right side (in FIG. 15) of the water outlet coupling end 312.

It is preferable that two or more of the welding protrusions 314 are formed, and the present disclosure exemplifies a case where they are formed in a total of six places. The welding protrusion 314 is a portion that is melted when the water outlet assembly 30 is fixed to the body 10 by welding.

The packing body 32 includes: a packing frame 320 coupled to one end of the water outlet coupling end 312; and a water outlet packing 322 of an elastic material coupled to the packing frame 320. That is, the packing body 32 is preferably made of one single structure. However, the packing body 32 is subdivided into the packing frame 320 that is installed and coupled to cross the upper end of the water outlet coupling end 312, and the water outlet packing 322 whose one end is integrally coupled to the packing frame 320.

Preferably, the packing frame 320 and the water outlet packing 322 are integrally formed by injection molding. That is, the packing frame 320 is preferably formed integrally with the upper end of the water outlet packing 322, and to this end, it is preferable that the packing frame 320 is manufactured by injection molding in a state of being inserted in the upper end of the water outlet packing 322.

The packing frame 320 may be made of a metal material like the water outlet 31. That is, preferably, the packing frame 320 and the water outlet 31 are made of a stainless steel material.

The packing frame 320 serves to connect each end (top) of the water outlet coupling end 312 of the water outlet 31 to each other. As described above, since the packing frame 320 and the water outlet 31 are made of a metal material such as a stainless steel material, a gap may be created between these metal materials, thereby causing water leakage. Accordingly, the water outlet packing 322 may serve to block the gap between the packing frame 320 and the water outlet 31 to prevent water leakage.

The packing frame 320 also serves to couple the water outlet packing 322 to the water outlet 31. That is, the packing frame 320 may also serve to support the water outlet packing 322 to be closely fixed to the right side of the water outlet coupling end 312 of the water outlet 31.

The water outlet packing 322 includes: a packing fastening portion 322a coupled to the packing frame 320 and mounted on the packing fixing end 312a; and a packing portion 322b formed integrally with the packing fastening portion 322a to seal a gap between the body 10 and the water outlet coupling end 312 by elasticity.

The packing fastening portion 322a is preferably formed to have a length corresponding to the packing frame 320 as shown. That is, the front to rear length of the packing fastening portion 322a is formed to correspond to the front to rear length of the packing frame 320, and the packing fastening portion 322a and the packing frame 320 are installed, in a state of being coupled to each other, to cross opposite ends of the water outlet coupling end 312.

The packing fastening portion 322a serves to block the gap between the packing frame 320 and the water outlet 31 to prevent water leakage, and at the same time, serves to guide the packing portion 322b to be coupled to the water outlet coupling end 312 by the packing frame 320. That is, the packing frame 320 is integrally coupled to the packing fastening portion 322a by insert injection and coupled to the upper end of the water outlet coupling end 312, so that the packing portion 322b is in close contact with the right side of the water outlet coupling end 312.

The packing portion 322b is formed to have an inverted triangular shape as a whole, so that when the right end of the water outlet 31 is coupled to the body 10, the packing portion 322b serves to seal the gap between the body 10 and the water outlet coupling end 312. Therefore, it is preferable that the packing portion 322b is made of an elastic material such as rubber.

The gap between the body 10 and the water outlet 31 may be completely shielded by the packing body 32. That is, as mentioned above, the gap between the outer body 11 and the water outlet and the gap between the inner body 12 and the water outlet are all shielded by the packing body 32, and thus, the entire gap between the body 10 and the water outlet 31 is shielded.

As described above, the water outlet assembly 30 is composed of two pieces, a water outlet 31 and a packing body 32. Accordingly, not only assembly is easy, but also the buffing operation inside the water outlet 31 is facilitated.

In other words, in the conventional configuration, since the water outlet 31 and the packing frame 320 are integrally formed to form one component, in this case, it is difficult to perform buffing on the inside of the concave water outlet 31.

On the other hand, in the present disclosure, as shown, since the packing frame 320 is formed separately from the water outlet 31 and separated, buffing of all parts such as the inside of the water outlet 31 may be easily performed.

Meanwhile, in the configuration as described above, assembly work may also be done easily. That is, since the packing frame 320 is integrally fixed to the packing fastening portion 322a of the water outlet packing 322 by injection molding, the assembly is completed by first inserting the upper end of the packing body 32 into the packing fixing end 312a of the water outlet coupling end 312, and then inserting the packing portion 322b of the packing body 32 into the packing seating groove 313.

In addition, the water outlet assembly 30 may be formed of a stainless steel material like the body 10. Thus, it is not easy to fix the water outlet assembly 30 to the body 10.

Preferably, the water outlet assembly 30 is coupled to the body 10 by welding. That is, with the water outlet assembly 30 facing the inner body 12, heat is applied to the welding protrusion 314 with an electrode to fix the water outlet 31 of the water outlet assembly 30 to the inner body 12.

The welding may be done by direct welding or series welding.

That is, the welding may be done by direct welding in which a positive electrode is connected to the water outlet 31 of the water outlet assembly 30, and a negative electrode is connected to the inner surface of the inner body 12 in contact with the welding protrusion 314 for welding.

Alternatively, it may also be possible to couple the water outlet assembly 30 to the body 10 by series welding in which both positive and negative electrodes are connected to the inner surface of the inner body 12 for welding with the water outlet 31 facing the inner body 12.

For example, series spot welding is spot welding in which an electric current is conducted by two electrodes on the same side through a support plate electrode (sometimes not in use) called a back bar. This form of welding has a great advantage of being able to weld from one side of the weldment (object to be welded) that is accessible with electrodes when it is difficult to access the back side as in the case of normal direct spot welding due to the shape and size of the weldment.

When the water outlet assembly 30 is coupled to the body 10 by such series welding, no weld marks are left on the outer surface of the outer body 11.

Coupling the water outlet assembly 30 to the body 10 by welding will be possible in other embodiments to be described below.

Figure 20:
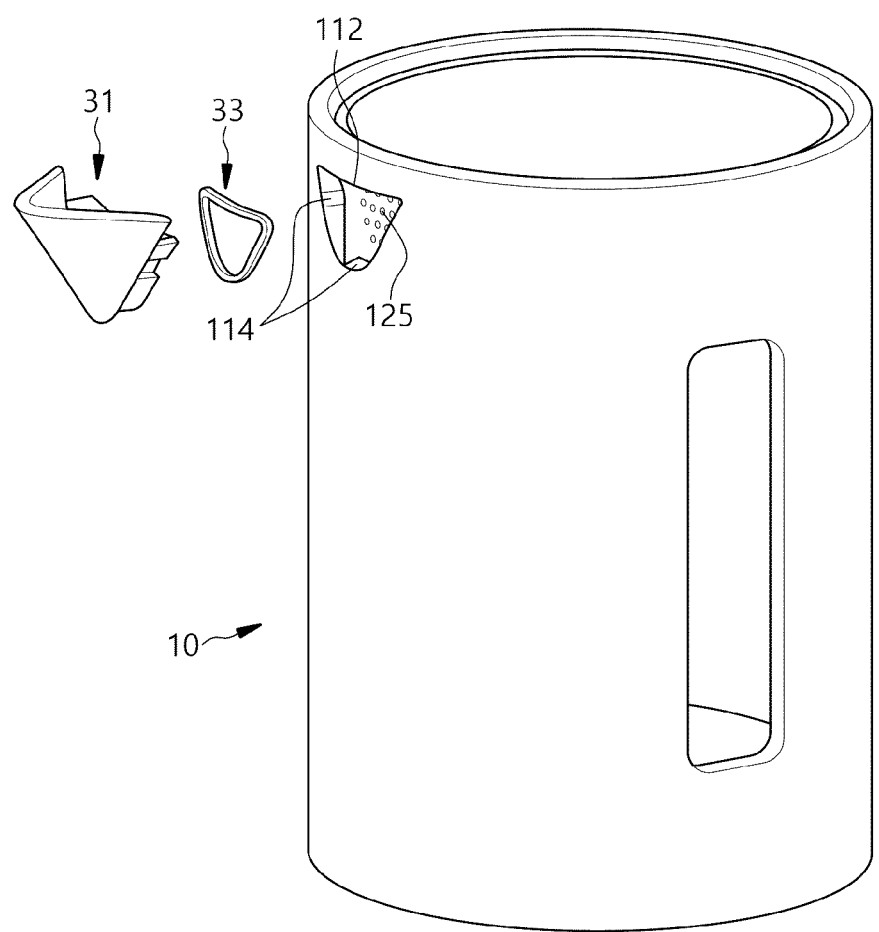
FIG. 20 is an exploded perspective view showing the configuration of the body and the second embodiment of the water outlet assembly constituting the embodiment of the present disclosure.
Figure 21:
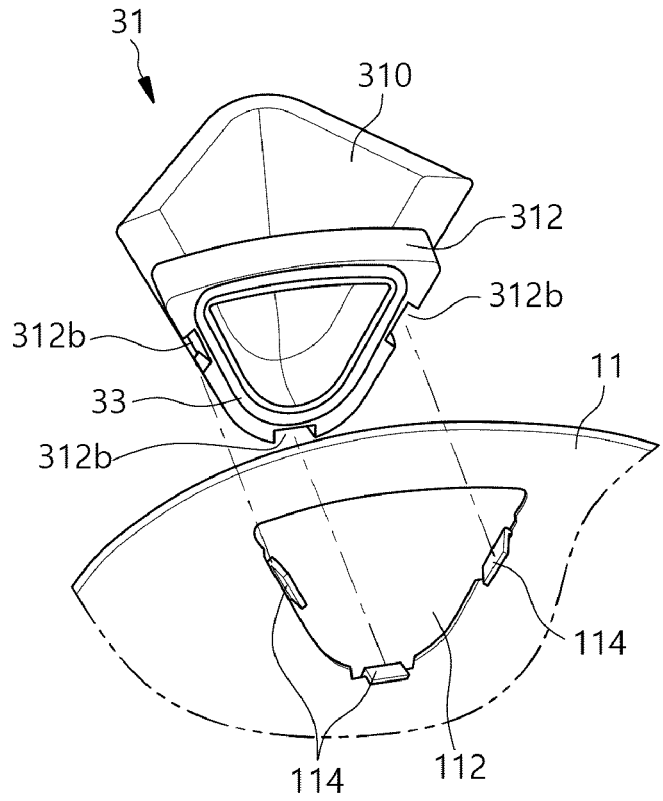
FIG. 21 is a perspective view showing a state in which the second embodiment of the water outlet assembly constituting the embodiment of the present disclosure is separated from the outer body.
Figure 22:
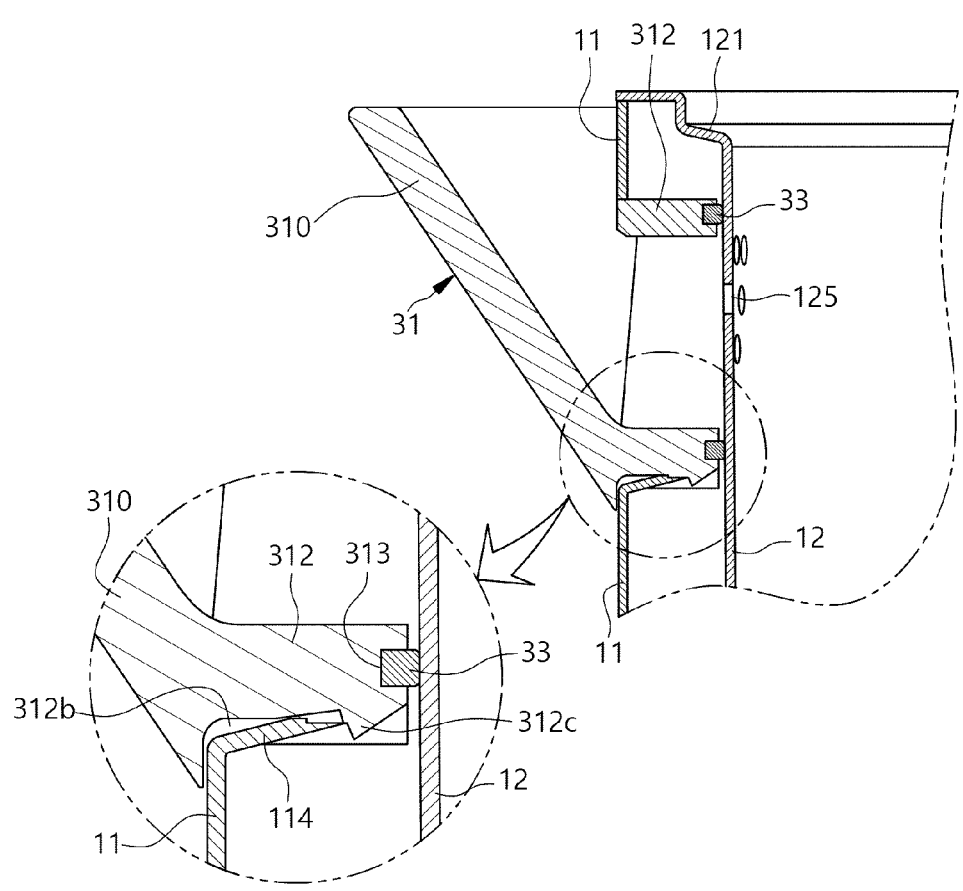
FIG. 22 is a partial cross-sectional view showing a state in which the second embodiment of the water outlet assembly constituting the embodiment of the present disclosure is mounted on the body.
Figure 23:
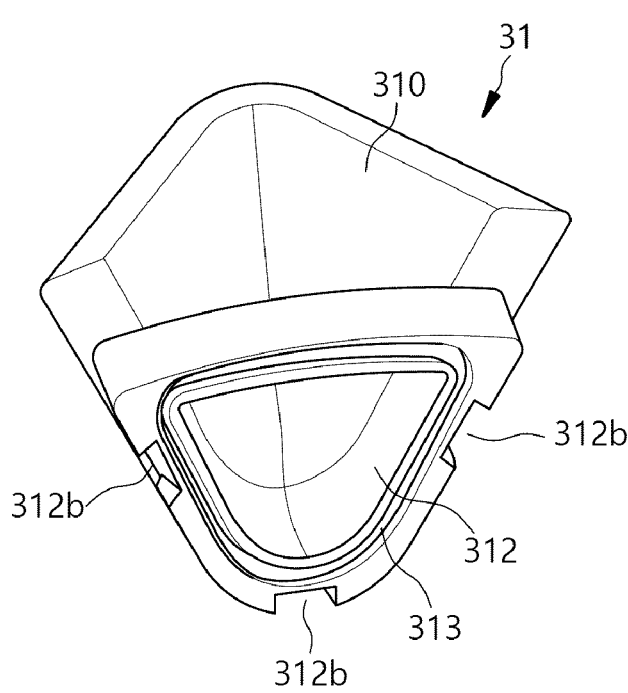
FIG. 23 is a perspective view showing the configuration of a water outlet of the second embodiment of the water outlet assembly constituting the embodiment of the present disclosure.

FIGS. 20 to 23 show the configuration of the second embodiment of the water outlet assembly 30. That is, FIG. 20 is an exploded perspective view showing the configuration of the body and the second embodiment of the water outlet assembly 30, FIG. 21 is a perspective view showing a state in which the second embodiment of the water outlet assembly 30 is separated from the outer body 11, and FIG. 22 is a partial cross-sectional view showing a state in which the second embodiment of the water outlet assembly 30 is mounted on the body 10. FIG. 23 is a perspective view showing the configuration of a water outlet 31 of the second embodiment of the water outlet assembly 30.

The second embodiment of the water outlet assembly 30 has a configuration that is fastened to the body 10 by press-fitting without an additional component. That is, it is preferable that the water outlet assembly 30 of the second embodiment is provided with a water outlet hook 114, which will be described below, and is fixed to the body 10 by press-fitting.

As shown, the water outlet assembly 30 includes: a water outlet 31 which is installed to protrude sideward from the body 10 and guides liquid inside the body 10 to be discharged outside; and a packing member 33 provided on a side of the water outlet 31 to shield a gap between the water outlet 31 and the body 10.

In addition, the body 10 and the water outlet assembly 30 are respectively provided with a water outlet hook 114 and a water outlet hook groove 312b, which are formed in a shape corresponding to each other to be fastened.

In the present disclosure, a configuration in which the water outlet hook 114 is provided in the body 10 and the water outlet hook groove 312b is formed in the water outlet assembly 30 to be coupled to each other will be described as an example.

To be specific, two or more water outlet hooks 114 are formed on the outer body 11. In the present disclosure, as shown, a case in which three water outlet hooks 114 are provided in the water outlet assembly hole 112 of the outer body 11 is exemplified.

Of course, it is also possible that the plurality of water outlet hooks 114 are formed on the inner body 12.

The water outlet hook 114 is preferably formed to have elasticity. That is, the water outlet hook 114 is preferably formed to extend from the outer body 11, and is preferably made of the same metal material as the outer body 11. Accordingly, this water outlet hook 114 has its own elasticity.

It is preferable that the water outlet hook 114 extends from the inner surface of the outer body 11 toward the inner body 12, so that one end (left end in FIGS. 20 and 22) of the water outlet hook 114 is in contact with the inner surface of the outer body 11, and the other end (the right end in FIGS. 20 and 22) faces the inner body 12.

It is preferable that the plurality of water outlet hooks 114 are installed such that the distance is gradually closer toward the end. That is, as described above, the three ends of the water outlet hooks 114 are installed closer to each other than the portions of the water outlet hooks connected to the outer body 11.

In this way, when the water outlet 31 of the water outlet assembly 30 is inserted into the water outlet assembly hole 112 of the outer body 11, the water outlet hook 114 is pushed outward by the water outlet 31 since the water outlet hook 114 has elasticity. Accordingly, the plurality of water outlet hooks 114 will be kept in close contact with the outer surface of the water outlet 31 by elasticity.

The water outlet 31 includes, as in the first embodiment described above, the water outlet body 310 serving as a discharge passage for water, and the water outlet coupling end 312 coupled to the body 10.

The water outlet coupling end 312 is formed to have an inverted triangular shape as a whole, and the water outlet hook groove 312*b* having a predetermined depth is formed at the right end (the tip front in FIG. 21) of the outer surface of the water outlet coupling end 312.

The water outlet hook 114 of the outer body 11 described above is inserted and fixed into the water outlet hook groove 312*b*. Accordingly, the water outlet hook groove 312*b* is preferably formed in a quantity and at a position corresponding to the water outlet hook 114.

When the water outlet assembly 30 is coupled to the body 10, the water outlet hook 114 is opened by the water outlet coupling end 312, and the water outlet hook 114 is accommodated in the water outlet hook groove 312*b*.

Meanwhile, a hook protrusion 312*c* protruding outward is further formed at the tip (right end in FIG. 22) of the water outlet hook groove 312*b*. The hook protrusion 312*c* prevents the water outlet hook 114 inserted into the water outlet hook groove 312*b* from falling out of the water outlet hook groove 312*b*, thereby preventing the water outlet assembly 30 mounted on the body 10 from being separated.

The packing member 33 is preferably made of an inverted triangular shape like the water outlet coupling end 312 as shown, and is in close contact with the right side (front side in FIG. 21) of the water outlet coupling end 312. Accordingly, on the right side (front side in FIG. 21) of the water outlet coupling end 312, a packing seating groove 313 in which the packing member 33 is seated is formed to be recessed inward (left side in FIG. 22).

It is preferable that the depth, that is, the width or diameter of the packing seating groove 313 is smaller than the width or diameter of the packing member 33, so that a part of the packing member 33 is installed to protrude to the outside of the water outlet coupling end 312 when the packing member 33 is seated in the packing seating groove 313.

In addition, the water outlet assembly 30 may be coupled to the body 10 by a bracket or the like.

Figure 24:
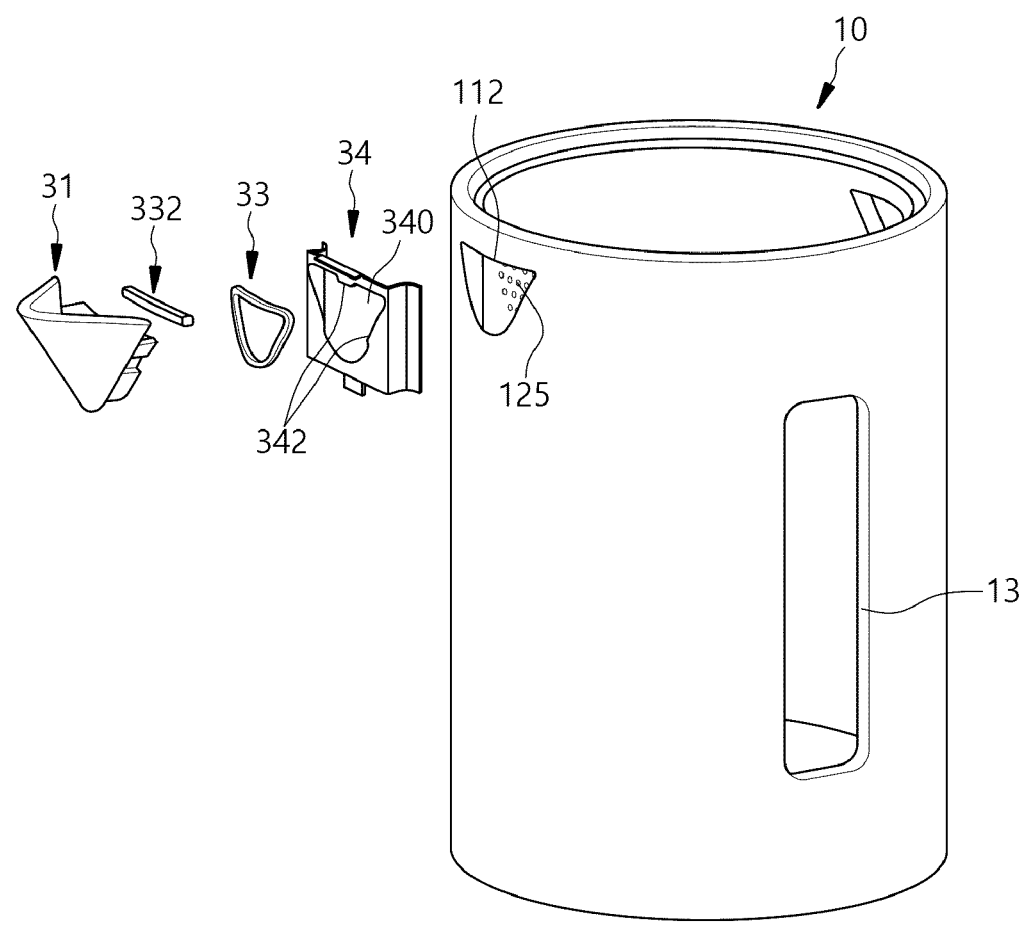
FIG. 24 is an exploded perspective view showing the configuration of the body and the third embodiment of the water outlet assembly constituting the embodiment of the present disclosure.
Figure 25:
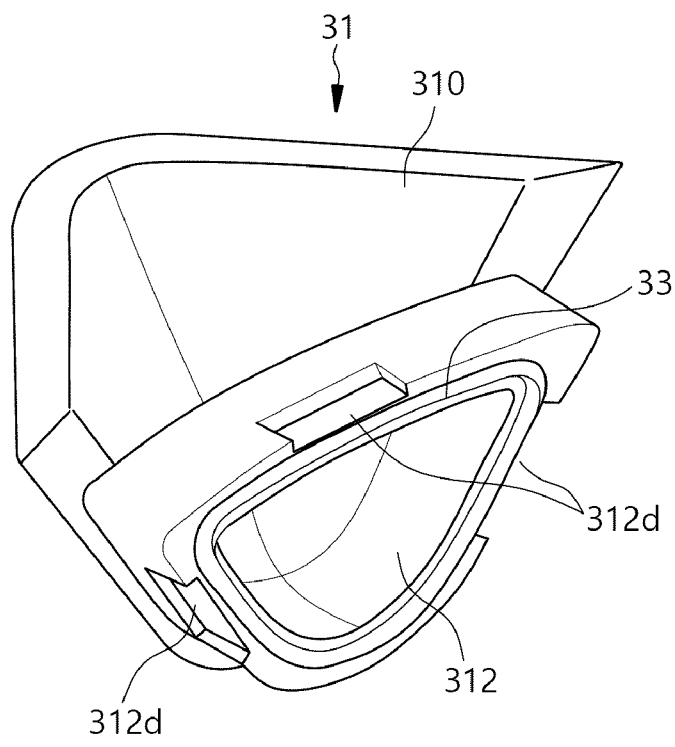
FIG. 25 is a perspective view showing a state in which the packing member is mounted to the water outlet of the third embodiment of the water outlet assembly constituting the exemplary embodiment of the present disclosure.
Figure 26:
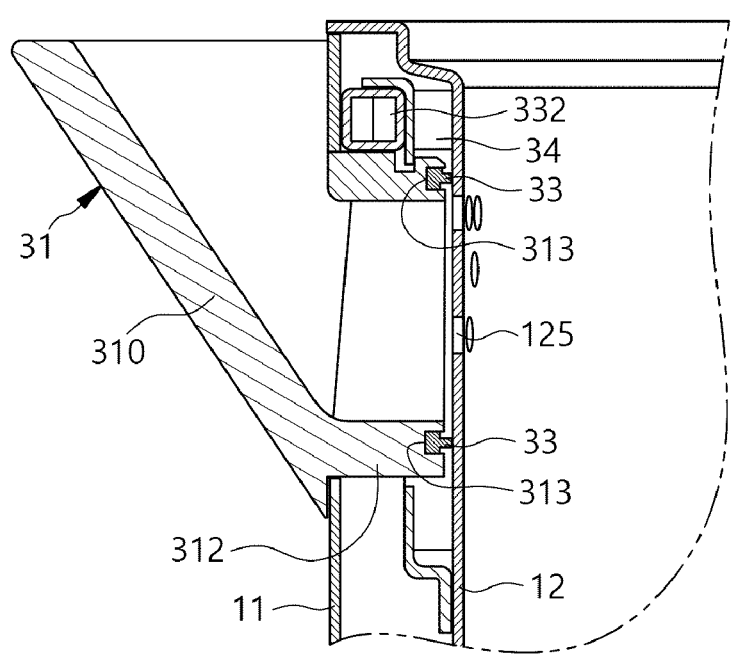
FIG. 26 is a partial cross-sectional view showing a state in which the third embodiment of the water outlet assembly constituting the embodiment of the present disclosure is mounted on the body.

FIGS. 24 to 26 show the configuration of the third embodiment of the water outlet assembly 30. That is, FIG. 24 is an exploded perspective view showing the configuration of the body 10 and the third embodiment of the water outlet assembly 30, FIG. 25 is a perspective view showing a state in which the packing member 33 is mounted to the water outlet 31 of the third embodiment of the water outlet assembly 30, and FIG. 26 is a partial cross-sectional view showing a state in which the third embodiment of the water outlet assembly 30 is mounted on the body 10.

As shown in these drawings, the water outlet assembly 30 includes: a water outlet 31 which is installed to protrude sideward from the body 10 and guides liquid inside the body 10 to be discharged outside; a packing member 33 provided on a side of the water outlet 31 and shielding a gap between the water outlet 31 and the body 10; and a water outlet bracket 34 for fixing and supporting the water outlet 31.

The water outlet 31 consists of, as described above, the water outlet body 310 serving as a discharge passage for water, and the water outlet coupling end 312 coupled to the body 10.

The water outlet bracket 34 serves to fix the water outlet 31 to the body 10, and is preferably mounted to the inner body 12. That is, the water outlet bracket 34 is closely fixed to the outer surface of the upper end of the inner body 12 by welding or the like.

As shown in the drawing, the water outlet bracket 34 has a bracket hole 340 in which the water outlet coupling end 312 is accommodated. The bracket hole 340 preferably has an inverted triangular shape corresponding to the outer shape of the water outlet coupling end 312.

In the water outlet bracket 34 and the water outlet 31, a bracket hook 342 and a bracket hook groove 312*d* that are formed to correspond to each other and are fastened are respectively formed.

In the present disclosure, the bracket hook 342 is formed in the water outlet bracket 34, and the bracket hook groove 312*d* is formed in the water outlet 31. Accordingly, when the water outlet assembly 30 comes into close contact with the body 10 and the bracket hook 342 is fitted and fixed to the bracket hook groove 312*d*, the water outlet assembly 30 is mounted to the body 10.

The bracket hook 342 is formed to protrude inward from the inner peripheral surface of the bracket hole 340, and preferably two or more are formed.

In the present disclosure, as shown, the case in which three bracket hooks 342 are formed is exemplified. That is, the bracket hook 342 is formed to protrude inward from every side of the bracket hole 340 having an inverted triangular shape.

A number of bracket hook grooves 312*d* are formed in the water outlet coupling end 312 in positions and in a quantity corresponding to the bracket hooks 342. Preferably, two or more bracket hooks 342 and bracket hook grooves 312*d* are respectively formed, and in the present disclosure, a case in which three each are formed is shown.

The bracket hook groove 312*d* is preferably formed to be depressed to a predetermined depth inward from the outer surface of the end of the water outlet coupling end 312 as shown.

In addition, the packing member 33 as described above is also provided. That is, the packing member 33 preferably has an inverted triangle shape like the water outlet coupling end 312 as shown, and is in close contact with the right side of the water outlet coupling end 312. Accordingly, on the right side of the water outlet coupling end 312, a packing seating groove 313 in which the packing member 33 is seated is formed to be recessed inward (left side in FIG. 26).

In addition, an auxiliary packing 332 for blocking a gap between the outer body 11 and the water outlet bracket 34 is further provided on one side of the water outlet bracket 34. That is, the auxiliary packing 332 as shown is further provided between the upper ends of the inner body 12 and the outer body 11, so that the gap between the upper ends of the inner body 12 and the outer body 11 and the gap between the upper ends of the outer body 11 and the water outlet bracket 34 are blocked, thereby blocking the flow of foreign substances or water.

Figure 27:
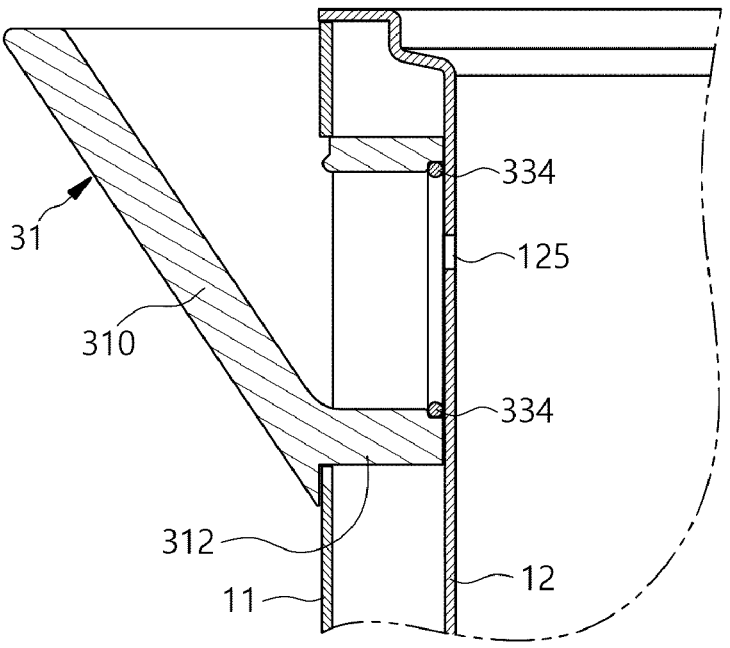
FIG. 27 is a partial cross-sectional view showing a state in which the fourth embodiment of the water outlet assembly constituting the embodiment of the present disclosure is mounted on the body.
Figure 28:
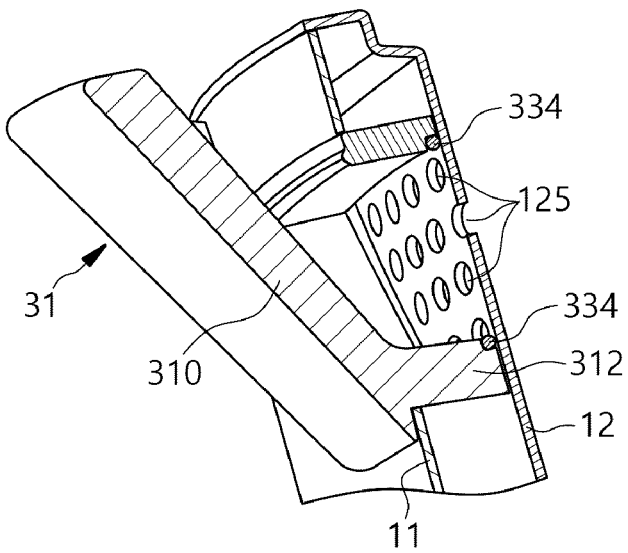
FIG. 28 is a perspective view of FIG. 27.

FIGS. 27 and 28 show the fourth embodiment of the water outlet assembly 30. That is, a partial cross-sectional view and a perspective view showing the fourth embodiment of the water outlet assembly 30 mounted on the body 10 are shown in FIGS. 27 and 28, respectively.

As shown in these drawings, the water outlet assembly 30 is configured to include the water outlet 31 which is installed to protrude sideward from the body 10 and guides liquid inside the body 10 to be discharged outside, and between the water outlet 31 and the body 10, a sealant 334 or the like is applied.

The water outlet 31 includes the water outlet body 310 that serves as a path for discharging water, and the water outlet coupling end 312 coupled to the body 10 as described above.

A sealant 334, etc. is applied to the coupling portion between the end of the water outlet coupling end 312 and the inner body 12 to perform a sealing action. The sealant refers to a liquid packing material, and serves to seal surfaces such as a metal joint surface.

Of course, such a sealant may be applied to various parts to block the gap between the water outlet assembly 30 and the body 10. That is, the sealant 334 as described above may be applied not only to the contact portion between the inner body 12 and the water outlet assembly 30, but also to the contact portion between the outer body 11 and the water outlet assembly 30.

In addition, a sealer may be further provided even when the sealant 334 is applied between the water outlet assembly 30 and the body 10. That is, it will be possible that the packing member 33 as described above is further provided between the water outlet assembly 30 and the body 10.

Meanwhile, in the above description, the case in which the water outlet hole 125 is formed in the inner body 12 has been described as an example, however, it may be possible to provide a mesh in the inner body 12 instead of the water outlet hole 125.

Hereinafter, a case in which the contents inside the body 10 pass through a mesh and are discharged through the water outlet assembly 30 will be described.

Figure 29:
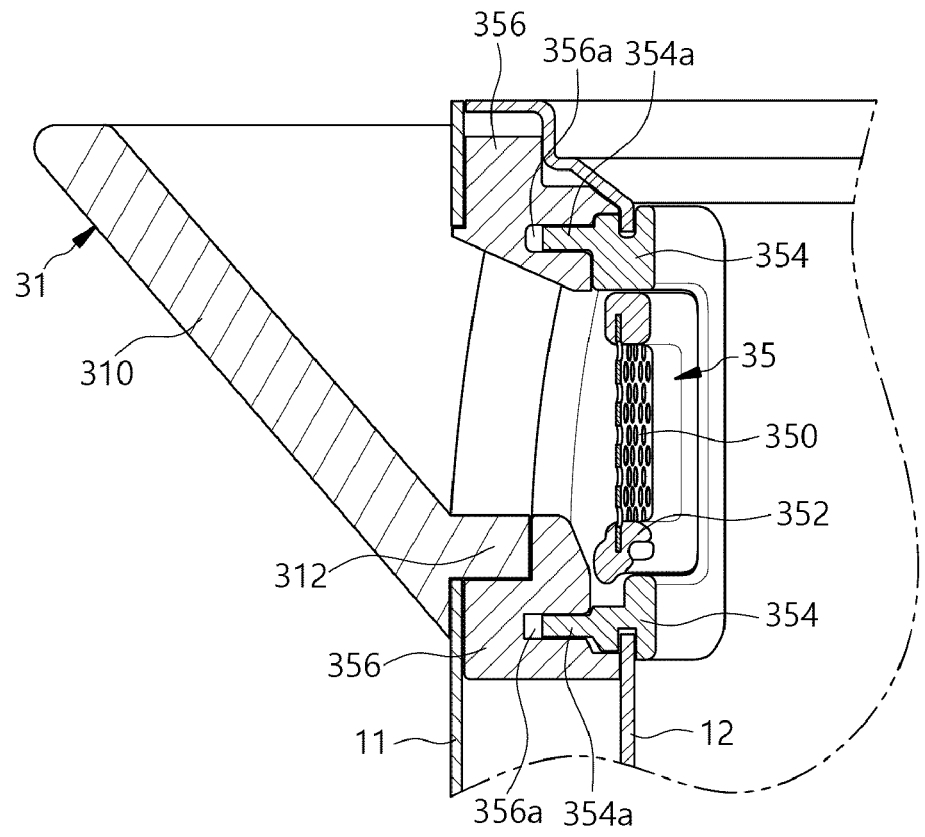
FIG. 29 is a partial cross-sectional view showing a state in which the fifth embodiment of the water outlet assembly constituting the embodiment of the present disclosure is mounted on the body.
Figure 30:
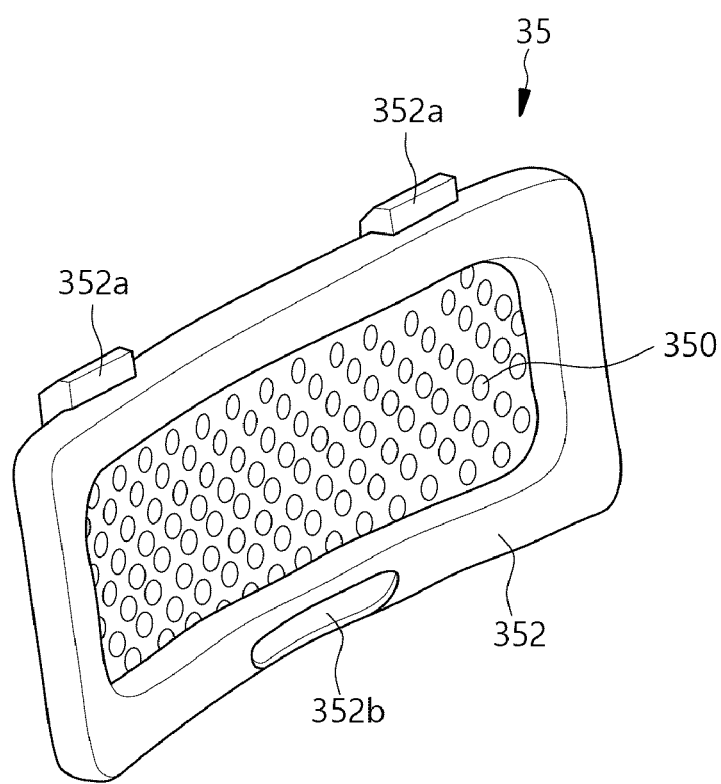
FIG. 30 is a perspective view showing the configuration of a mesh member of the fifth embodiment of the water outlet assembly constituting the embodiment of the present disclosure.

FIGS. 29 and 30 show the fifth embodiment of the water outlet assembly 30. That is, FIG. 29 is a partial cross-sectional view showing a state in which the fifth embodiment of the water outlet assembly 30 is mounted on the body 10, and FIG. 30 is a perspective view showing the configuration of a mesh member of the fifth embodiment of the water outlet assembly 30.

As shown in these drawings, the body 10 is further provided with a mesh member 35 for filtering foreign substances discharged through the water outlet assembly 30. The mesh member 35 is preferably mounted on the inner body 12.

The mesh member 35 is composed of a mesh part 350 in which a plurality of holes are formed, and a mesh rim 352 surrounding the outside of mesh part 350. In the present disclosure, a case in which the mesh member 35 is formed to have a rectangular shape is shown, and the mesh member 35 is preferably formed to have a curvature corresponding to the curvature of the inner body 12.

In the mesh rim 352, a mesh coupling protrusion 352*a* is further formed to protrude outward in order to prevent the mesh member 35 that is coupled to the mesh fixing member 354 from being separated. That is, as shown, it is preferable that one or more mesh coupling protrusions 352*a* protruding upward are further formed on the upper surface of the mesh rim 352 so that the mesh member 35 is not separated into the inner body 12.

A handle groove 352*b* for facilitating gripping of the mesh member 35 is further formed in the mesh rim 352. That is, it is preferable that the mesh member 35 is detachably installed on the inner body 12 so that a user may replace the mesh member 35.

Accordingly, the mesh member 35 may be provided with a handle groove 352*b* that allows the user to easily grip the mesh member 35 with his or her fingers. The handle groove 352*b* may be formed to be depressed inwardly from the outer surface of the lower end of the mesh rim 352 of the mesh member 35 as shown.

The inner body 12 is further provided with a mesh fixing member 354 for supporting the mesh member 35 to be detachably mounted. That is, as shown, at the upper end of the inner body 12, the above-described water outlet hole 125 forming portion is cut to form a hole, and the mesh fixing member 354 is mounted on this hole portion.

The mesh fixing member 354 preferably has a rectangular frame shape with a hollow inside, and the inner peripheral surface is formed to correspond to the outer peripheral surface of the mesh member 35. Accordingly, it is preferable that the mesh member 35 is mounted to the inside of the mesh fixing member 354 by press-fitting, etc.

On one side of the mesh rim 352, a sealing member 356 for shielding the gap between the inner body 12 and the outer body 11 is further installed. That is, as shown, the sealing member 356 is provided at the edge of the portion where the water outlet assembly 30 is installed, so as to surround the water outlet 31 of the water outlet assembly 30.

Accordingly, the sealing member 356 is preferably installed to be inserted between the inner body 12 and the outer body 11 as shown, and the sealing member 356 is preferably made of a material having elasticity.

In addition, it is preferable that the mesh rim 352 and the sealing member 356 have a fastening protrusion 354*a* and a fastening groove 356*a* which are formed in a shape corresponding to each other and are coupled to each other.

For example, a plurality of fastening protrusions 354*a* protruding to the left side (in FIG. 29) are formed on the mesh rim 352, and a plurality of fastening grooves 356*a* recessed to the left side (in FIG. 29) are formed in the sealing member 356 so that the fastening protrusions 354*a* and the fastening grooves 356*a* engage with each other.

Figure 31:
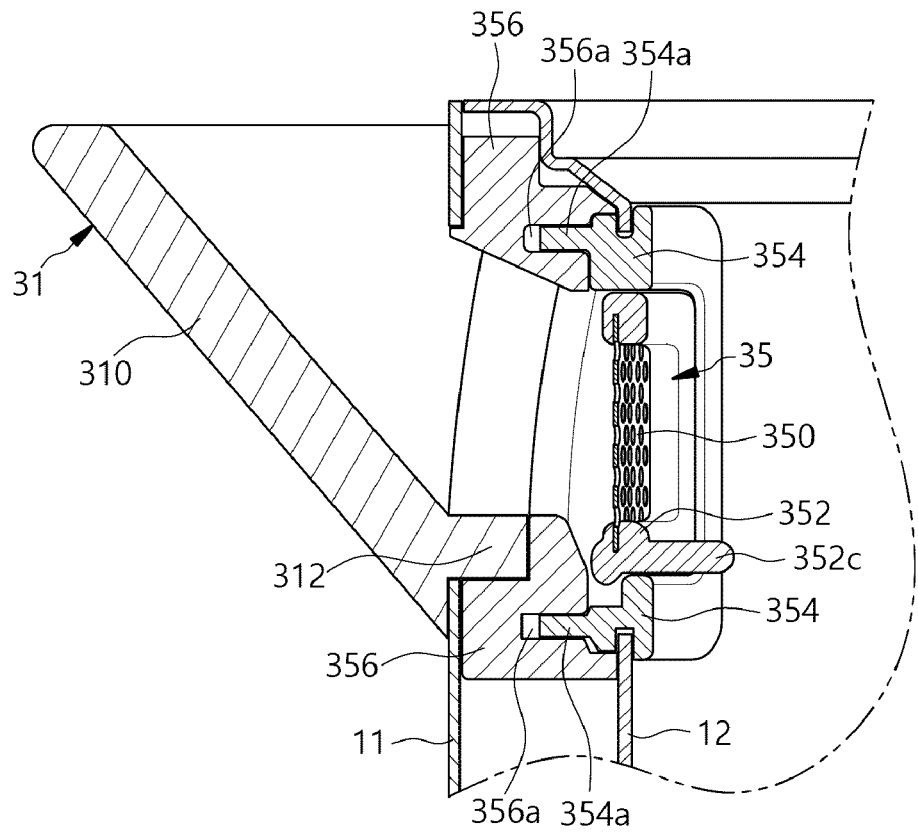
FIG. 31 is a partial cross-sectional view showing a state in which the sixth embodiment of the water outlet assembly constituting the embodiment of the present disclosure is mounted on the body.
Figure 32:
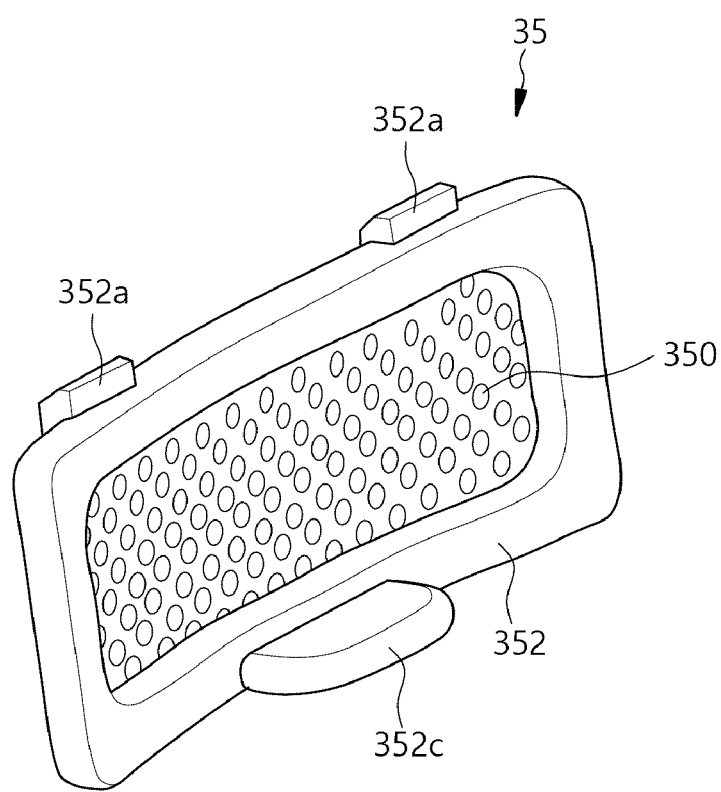
FIG. 32 is a perspective view showing the configuration of a mesh member of the fifth embodiment of the water outlet assembly constituting the embodiment of the present disclosure.

FIGS. 31 and 32 show the sixth embodiment of the water outlet assembly 30. That is, FIG. 31 is a partial cross-sectional view showing a state in which the sixth embodiment of the water outlet assembly 30 is mounted on the body 10, and FIG. 32 is a perspective view showing the configuration of a mesh member 35 of the fifth embodiment of the water outlet assembly 30.

As shown, the sixth embodiment of the water outlet assembly 30 is different from the fifth embodiment described above in only a part of the mesh member 35. That is, a handle 352*c* that facilitates gripping of the mesh member 35 is formed to protrude to one side.

To be specific, as shown, in the fifth embodiment, a handle groove 352*b* is formed in the mesh member 35, however, in the sixth embodiment, instead of the handle groove 352*b*, the handle 352*c* is formed to protrude outward (the right side in FIG. 31) at the same position.

Therefore, a user may move the mesh member 35 while holding the protruding handle 352*c* with his/her hand, or may easily install and remove the mesh member 35.

Meanwhile, although not shown in the drawings, the water outlet assembly 30 may be configured to be fixed to the body 10 by a fastening member. That is, the water outlet assembly 30 may be fixedly mounted to the body 10 by a fastening member such as a fastening bolt, and may be configured to guide the discharge of water.

Hereinafter, the operation of the electric kettle according to the present disclosure having the above configuration will be described with reference to the drawings.

First, in order to use the electric kettle 1 according to the present disclosure, a user inserts a power line (not shown) connected to the base 60 into an outlet so that the power is connected.

Then, water or contents are put into the heating space 101 inside the body 10, and the body 10 is placed on the base 60.

When the body 10 is seated on the base 60, the upper power module 55 and the lower power module 64 come into contact with each other so that supplying power from the base 60 to the body 10 is possible.

Next, the user may operate the pressing part of the handle 40 to start heating the heater 54. At this time, the user may check the set temperature through the display part, and may operate to start heating the water accommodated in the heating space 101. That is, by controlling the operation of the heater 54 by pressing the on/off button, the user may control to heat the water and stop heating the water.

In addition, by operating a button or the like, it will be possible to set the temperature and control the operation. If necessary, two or more manipulation parts (pressing parts) may be provided.

By these operations, the heater 54 may start to operate, and the water contained in the heating space 101 may be heated by the heat of the heater 54.

By the sensing of the temperature sensor assembly 53, when the water in the heating space 101 reaches a set temperature, the heater 54 may stop the operation, and accordingly, the electric kettle 1 is to complete the operation.

When the operation of the electric kettle 1 is completed, the user may hold the handle 40 and lift the body 10 to separate it from the base 60, and may pour heated water through the water outlet assembly 30 by tilting the electric kettle 1.

Thanks to the double-wall structure of the body 10, the electric kettle 1 may reduce or block heat conduction in a state in which the water is heated. Therefore, even if the user comes into contact with the outer surface of the body 10, the surface is not excessively hot, so it is possible to secure safety in use, and even in a state in which the heater 54 is not operated, the temperature of the heated water may be maintained for a long time.

Meanwhile, as described above, at the upper end of the body 10, the water outlet assembly 30 is formed to protrude outward. That is, the water outlet assembly 30 in the form of a spout is formed to protrude to the outside of the body 10 to guide the discharge of water inside the body 10.

Furthermore, the water outlet assembly 30 is further provided with various sealing members such as a packing member 33 to block water leakage through the periphery of the water outlet assembly 30. Therefore, even when the user tilts the electric kettle to dispense water, water leakage through the upper end of the body 10 or around the water outlet assembly 30 is prevented.

The scope of the present disclosure is not limited to the embodiments illustrated above, and many other modifications based on the present disclosure will be possible for those skilled in the art within the above technical scope.

The invention claimed is:

1. An electric kettle, comprising:
   a body in which a content is accommodated;
   a lid to cover an opened upper side of the body;
   a water outlet assembly provided at a side of the body to guide the content in the body to be discharged;

a heating module disposed at the body to heat the content inside the body;
   wherein the water outlet assembly includes a water outlet body, a water outlet coupling end protruding in a direction of the body, and a packing frame coupled to the water coupling end,
   wherein two packings are provided between the water outlet assembly and the body to prevent leakage of the content,
   wherein the packing frame includes a first recess on an upper surface where a first packing is disposed and a second recess on a side surface where a second packing is disposed.

2. The electric kettle of claim 1, wherein the water outlet assembly includes:
   the water outlet to protrude outward from the side of the body and to guide the content inside the body to be discharged, and
   the body includes a filter at the side of the body to filter the content discharged through the water outlet assembly.

3. The electric kettle of claim 2, wherein the water outlet includes:
   a water outlet body to serve as a path for discharging the content, and
   a water outlet coupling end formed integrally at a side of the water outlet body to couple to the side of the body.

4. The electric kettle of claim 1, wherein the water outlet coupling end has an arc shape, and has a packing fixed end at each end of the arc shape to which a corresponding end of the second packing is fixedly mounted.

5. The electric kettle of claim 4, comprising: a packing fastening portion coupled to the packing frame; and the first packing formed integrally with the packing fastening portion to seal the gap between a side of the body and the water outlet coupling end by elasticity.

6. The electric kettle of claim 5, wherein the packing frame is installed to cross opposite ends of the water outlet coupling end.

7. The electric kettle of claim 6, wherein the water outlet coupling end includes a packing seating groove in which the second packing is seated.

8. The electric kettle for claim 1, wherein the outlet assembly is fixed to the side of the inner body by press-fitting with the opening of the outer body.

9. The electric kettle for claim 1, wherein the inner body includes a filter disposed corresponding to the opening of the outer body.

10. The electric kettle of claim 9, wherein the filter is removably fixed to the side of the inner body.

* * * * *